United States Patent [19]
Shannon et al.

[11] Patent Number: 5,389,285
[45] Date of Patent: Feb. 14, 1995

[54] LIQUID CRYSTAL COUPLED DICHROIC DYES

[75] Inventors: Paul J. Shannon, Exton, Pa.; Brian J. Swetlin, Wilmington, Del.

[73] Assignee: Hercules Incorporated, Wilmington, Del.

[21] Appl. No.: 448,409

[22] Filed: Dec. 11, 1989

[51] Int. Cl.[6] .................... C09K 19/00; C09K 19/52; G02F 1/13
[52] U.S. Cl. .............. 252/299.1; 252/299.01; 359/103
[58] Field of Search .............. 252/299.1, 299.01; 359/103

[56] References Cited

U.S. PATENT DOCUMENTS

| | | | |
|---|---|---|---|
| 4,402,854 | 9/1983 | Moeller et al. | 252/299.1 |
| 4,483,593 | 11/1984 | Imazeki et al. | 250/349 |
| 4,588,517 | 5/1986 | Kaneko et al. | 252/299.1 |
| 4,631,328 | 12/1986 | Ringsdorf et al. | 526/259 |
| 4,676,923 | 6/1987 | Yasui et al. | 252/299.1 |
| 4,721,779 | 1/1988 | Etzbach | 534/577 |
| 4,770,809 | 9/1988 | Heidenreich et al. | 252/299.1 |

OTHER PUBLICATIONS

"Asymmetric dimeric Lc the preparation & properties of 2-4-cyanbiphenyl-4'-oxy-Ω-(4-n-alylanilinebenzylolene-4'-oxy)hexanes," Liquid Crystals. 1988. vol. 3. No. 5, pp. 645–650.

"Effect of structure of photoresponsive molecules on photochemical phase transition of liquid crystals I. Synthesis of thermotropic properties of photochronic azobenzene derivative" Molecular Cryst. Liq. Cryst. 182B, 357–71, 1990.

Matsumoto et al, "Effect of Hydrophobic Group on the Structure of Langmuir Blodgett Films of Amphiphilic Cyanine and Squarylium Dyes", Chemistry Letters, pp. 1085–1088 (Chemical Society of Japan 1988).

Matsumoto et al, "Monolayers and Langmuir–Blodgett Films of Amphiphilic Dyes with Mesogenic Unit in the Hydrophobic Part., Surface Chemical and Optical Characterization", J. Phys. Chem., vol. 93, No. 15, pp. 5877–5882 (1989).

Gray, "Dyestuff and Liquid Crystals", Chimia 34, No. 2, pp. 47–58 (1980).

H. Finkelmann, "Synthesis, Structure, and Properties of Liquid Crystal Side Chain Polymers", Polymer Liquid Crystals, Chapter 2, pp. 35–62 (Academic Press, Inc. 1982).

T. Ikeda et al, "Effect of Structure of Photoresponsible Molecules on Photochemical Phase Transition of Liquid Crystals I. Synthesis and Thermotropic Properties of Photochronic Azobenzene Derivatives", Mol. Cryst. Liq. Cryst. vol. 182 B, pp. 357–371 (1990).

D. Bauman, "The Study of the Guest Effect on the Nematic Phase Stabilization", Mol. Cryst. Liq. Cryst., vol. 159, pp. 197–218 (1988).

Primary Examiner—Shean Wu
Attorney, Agent, or Firm—Mark Goldberg

[57] ABSTRACT

Liquid crystal coupled dichroic dye compositions comprising a dichroic dye moiety coupled to one or two liquid crystal moieties by a flexible spacer group having at least four atoms linked in a linear fashion; guest-host compositions comprising such liquid crystal coupled dichroic dye compositions dissolved in liquid crystal hosts and devices comprising such guest-host compositions; and liquid crystal coupled aromatic amines useful for forming the liquid crystal coupled dichroic dyes, are disclosed.

19 Claims, 15 Drawing Sheets

EXAMPLE NO.

1

2

3

4

5

6

7

EXAMPLE NO.

8

9

10

11

EXAMPLE NO. 12 13 14

B₁ =  — CN

B₂ =  — OC₆H₁₃

(A)

(B)

n = 2 – 13
DMF = DIMETHYL FORMAMIDE
Ac = ACETATE

1. NaNO$_2$ / HCl

2.

n = 2 – 12

K₂CO₁₃
ACETONE (A)

n = 2 - 12

LIQUID CRYSTAL COUPLED DICHROIC DYES

This invention is directed to novel liquid crystal coupled dichroic dye compositions, and guest-host compositions and devices comprising the same. It is also directed to novel liquid crystal coupled aromatic amines useful in forming the liquid crystal coupled dichroic dyes.

BACKGROUND OF THE INVENTION

Dichroic dyes are useful in guest-host liquid crystal devices, such as displays. Guest-host compositions are formed by dissolving dichroic dyes in a host solvent comprised of one or more liquid crystals. Typically, the guest-host composition is placed in a cell comprising two glass substrates coated with transparent electrodes and other compositions (e.g., alignments layer(s)) and having a adhesive layer perimeter as shown in FIGS. 11 and 12 (see the discussion of FIGS. 11 and 12, below). The liquid crystal and dye molecules of the guest-host composition are generally aligned predominantly parallel to the glass substrates. When aligned in this fashion, upon application of an electric field these molecules realign predominantly perpendicular to the glass substrates. The change in orientation results in a significant change in the intensity of absorption of the dye(s). This change in absorption is easily detectable to the eye.

Control of orientation is essential for efficient performance of such guest-host mixtures and the liquid crystal displays and other devices in which they are used. The order parameter, S, is a measure of the ordering of the dye in a liquid crystal host matrix (the method of measurement is discussed below). S ranges from 0 through 1. The higher the number, the higher the ordering of the dichroic dye in the host and the higher the contrast of a guest-host mixture containing the dye.

Several patents describe the benefit of having specific groups attached to dye chromophores to improve the dichroism, order parameters, and/or solubility of a dye in a liquid crystal host solvent.

U.S. Pat. No. 4,402,854 discloses 2,6-di[4-n-pentylcyclohexylbenzoyloxy]-anthraquinones. The liquid crystal moiety is bonded directly to the anthraquinone radical through an ester linkage but without a flexible alkylene spacer.

U.S. Pat. No. 4,676,923 discloses dichroic dyestuffs with phenylcyclohexyl and biphenyl moieties directly bonded to azo chromophores. No spacer group is used.

U.S. Pat. No. 4,588,517 discloses, among other things, liquid crystal moieties, such as biphenyl, cyclohexylcyclohexyl and phenylcyclohexyl moieties bonded to azo dyes through linkages having two linearly linked atoms, such as a

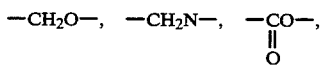

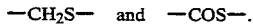

These patents suggest that bonding of such dye moieties to phenyl cyclohexane, biphenyl or cyclohexylcyclhexyl ring moieties may improve the order parameter of guest-host systems and, thus, the optical properties of liquid crystal displays containing such guest-host systems. The compounds described in these patents have no more than two atoms linking the dye to the dicyclic ring system and, thus, are believed to be field and have low solubility in liquid crystal hosts.

The inventors have discovered that coupling of liquid crystal moieties to dichroic dyes moieties through flexible spacers can substantially improve the order parameter while still maintaining (and in some cases improving) solubility of the dichroic dyes in liquid crystal host solvents without changing the fundamental absorption characteristics of the dye chromophore.

SUMMARY OF THE INVENTION

Accordingly, this invention is directed to liquid crystal coupled dichroic dye compositions comprising a dichroic dye moiety coupled to one or two liquid crystal moieties by a flexible spacer group having at least four atoms linked in a linear fashion, and devices comprising such liquid crystal coupled dichroic dye compositions. The liquid crystal coupled dyes have the general structures depicted in FIG. 1.

This invention is also directed to guest-host compositions comprising the liquid crystal coupled dichroic dye composition dissolved in a nematic or smectic liquid crystal host solvent, and liquid crystal devices comprising such guest-host compositions.

In addition, this invention is directed to liquid crystal coupled aromatic amines useful for forming the liquid crystal coupled dichroic dyes.

SUMMARY OF THE INVENTION

DETAILED DESCRIPTION OF THE INVENTION

Figure 1:
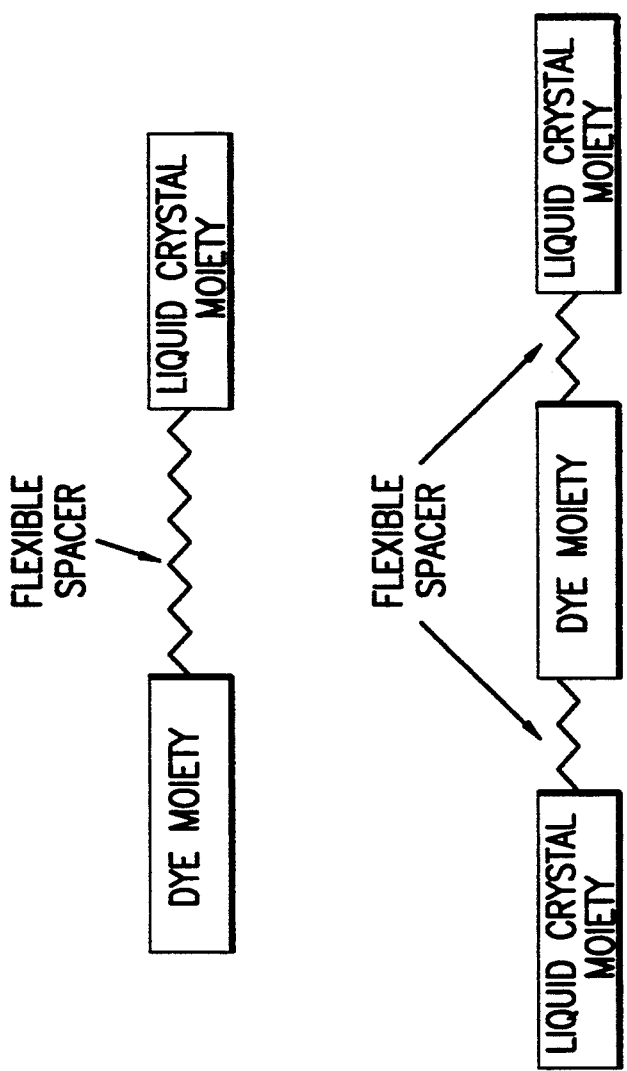
FIG. 1 depicts the general structures of the liquid crystal coupled dyes of this invention.

The liquid crystal coupled dichroic dye compositions of this invention have three essential components: the dichroic dye chromophore, flexible spacer(s) (X—Y—Z of formulae (I) and (II), below) and liquid crystal moiety(ies).

Preferably the liquid crystal coupled dichroic dye compositions have the general formulae:

$$A-X-Y-Z-B \qquad (I)$$

and $$B-Z-Y-X-A-X-Y-Z-B \qquad (II)$$

wherein A is a nonionic dichroic dye moiety having an absorption maximum between 400 and 2000 nm and an extinction coefficient of greater than 2,000;

X and Z are independently:

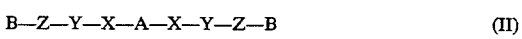

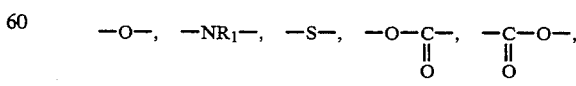

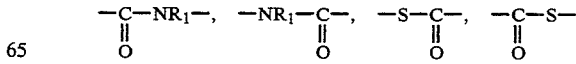

or a covalent bond linkage, and $R_1$ is hydrogen, a methyl group, or an ethyl group;

Y is a linear or branched $C_2$ to $C_{12}$ alkyl group which is uninterrupted or interrupted by one or more of —O—, —S— or —NR$_1$—;

B is a liquid crystal moiety having the general formula:

—D—W—D—R$_2$, (III)

—D—W—D—D—R$_2$, or (IV)

—D—D—W—D—R$_2$, (V)

wherein D is a 1,4-disubstituted benzene ring, a 1,4-disubstituted cyclohexane ring, or a 2,5-disubstituted pyrimidine ring, W is

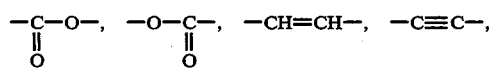

or a covalent bond linkage, and R$_2$ is hydrogen, a $C_1$ to $C_{12}$ alkyl group, $C_5$ to $C_7$ cycloalkyl group, $C_1$ to $C_{12}$ alkoxy group, $C_1$ to $C_{12}$ alkoxycarbonyl group, nitrile group, nitro group or NR$_3$R$_4$ wherein R$_3$ and R$_4$ are independently hydrogen or $C_1$ to $C_{12}$ alkyl groups; and X—Y—Z comprises at least four linearly linked atoms.

The dye moiety A may be any nonionic dye chromophore with an absorption maximum between 400 and 2000 nm, preferably 400–800 nm, and an extinction coefficient of greater than 2000. Preferred are anthraquinone, azo, diazo, trisazo, tetraazo, pentaazo, hexaazo, stilbene, and phthalocyanine dye moities. More preferred are those that by themselves show dichroic order parameters of at least 0.4 in nematic liquid crystal hosts. Most preferred are azo, polyazo and anthraquinone dyes.

The dichroic dye moiety A can be coupled to one or two liquid crystal moieties B. Suitable liquid crystal moieties contain two or three benzene rings with 1,4-substitution patterns, cyclohexyl rings with 1,4-substitution patterns or pyrimidines with 2,5 substitution patterns that are connected to one another or through one connecting link W. When three rings are present W should not be a covalent bond linkage. The preferred liquid crystal moiety B is D—W—D—R$_2$. R$_2$ is preferably a nitrile or nitro group.

Preferred flexible spacers (X-Y-Z) comprise linear chains of 6 to 12 atoms in length and most preferably are linear chains having an even number of atoms between the dye radical, A, and the liquid crystal radical, B. Preferred are linear carbon chains where Y has 4 to 10 carbon atoms and X and Z are independently —O—, —NR$_1$—, —S— or a covalent bond. Most preferred are flexible spacers wherein Y is a linear, unsubstituted and uninterrupted alkyl group having an even number of carbon atoms.

The liquid crystal coupled dyes of this invention can be prepared by standard synthetic methods used to modify azo, anthraquinone and other dyes.

In the case of azo and poly(azo) dyes, novel liquid crystal coupled aromatic amines intermediates have been developed for the synthesis of liquid crystal coupled azo and poly(azo) dyes. These liquid crystal coupled aromatic amines have the general formula:

V—Y—Z—B (VI)

wherein V is

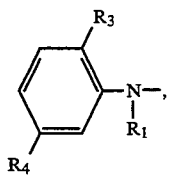

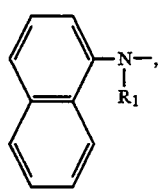

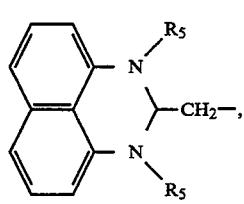

or

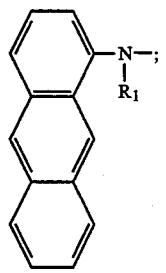

R$_3$ and R$_4$ are independently hydrogen, methyl, methoxy, ethoxy, Br, Cl, I or OH; R$_5$ is hydrogen, or a $C_1$ to $C_{10}$ alkyl group; and Y, Z, R$_1$ and B are as described above.

Figure 4:
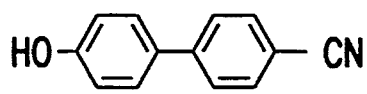
FIGS. 4–10 show various reaction schemes useful for preparing the liquid crystal coupled aromatic amines and dyes of this invention.
Figure 4:
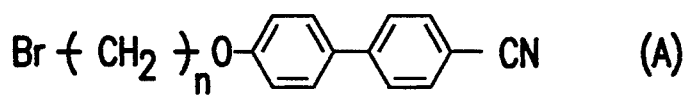
Figure 4:
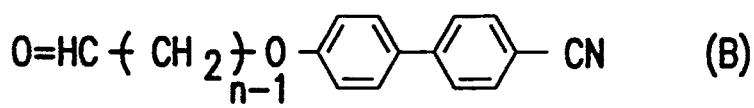

These intermediates can be prepared by preparing liquid crystal coupling agents by the synthetic route shown in Scheme 1 (FIG. 4) and, then, modifying the aromatic amines with the coupling agents. Aromatic amines useful in this invention are anilines and substituted anilines, naphthyl amines, amino anthracenes and 1,8-naphthalene diamines. Preferred aromatic amines for this invention are anilines, naphthyl amines and 1,8-naphthalene diamines.

The liquid crystal coupling agent (A) is prepared by alkylation of 4'-hydroxybiphenylnitrile with a dibromoalkane. Several dibromoalkanes and other two or three ring liquid crystal moieties can be used to give a variety of spacer lengths and structural patterns in the liquid crystal coupling agent. Alternatively, the bromide coupling agent (A) can be transformed into an aldehyde coupling agent (B).

Figure 5:
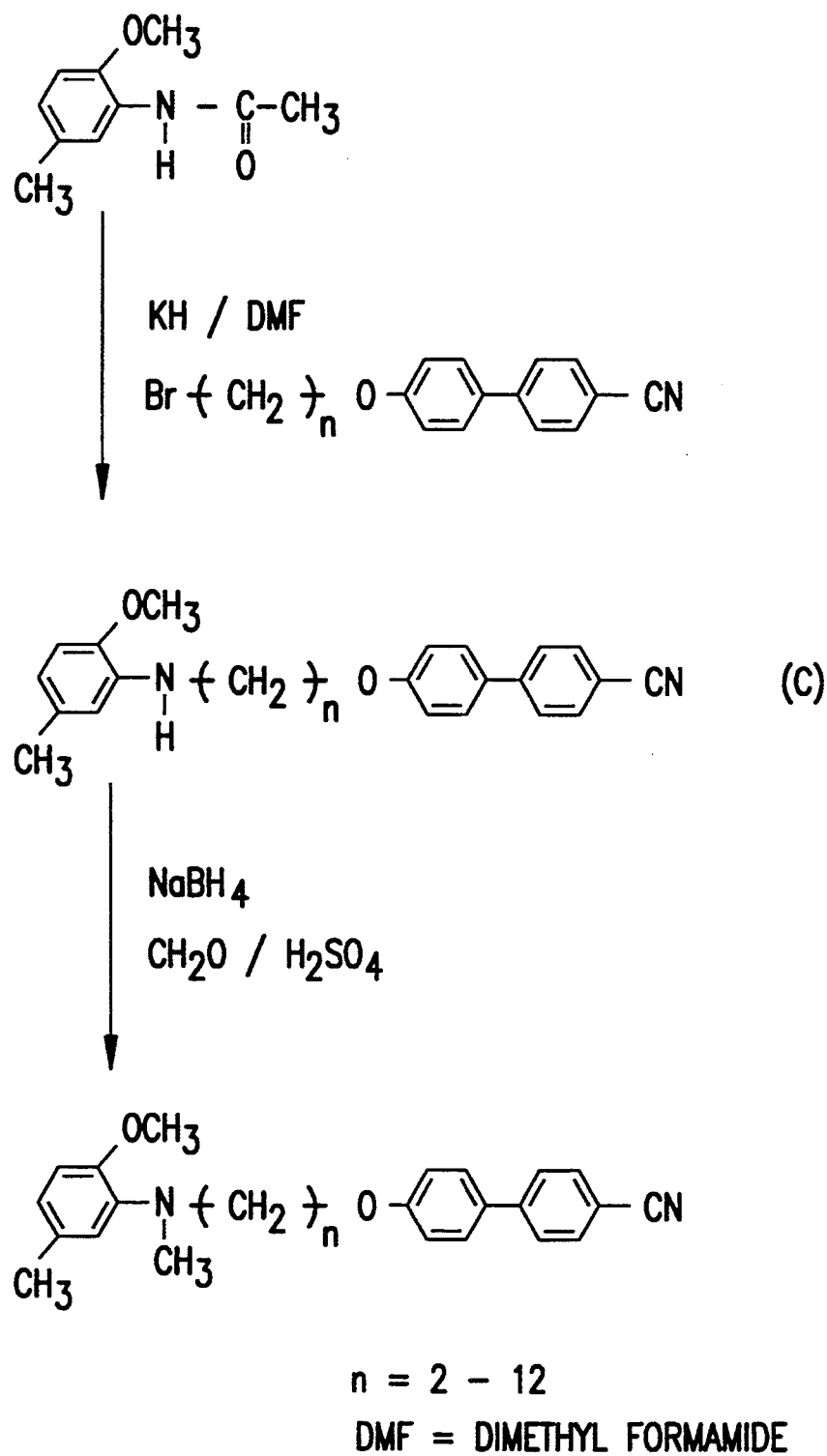
Figure 6:
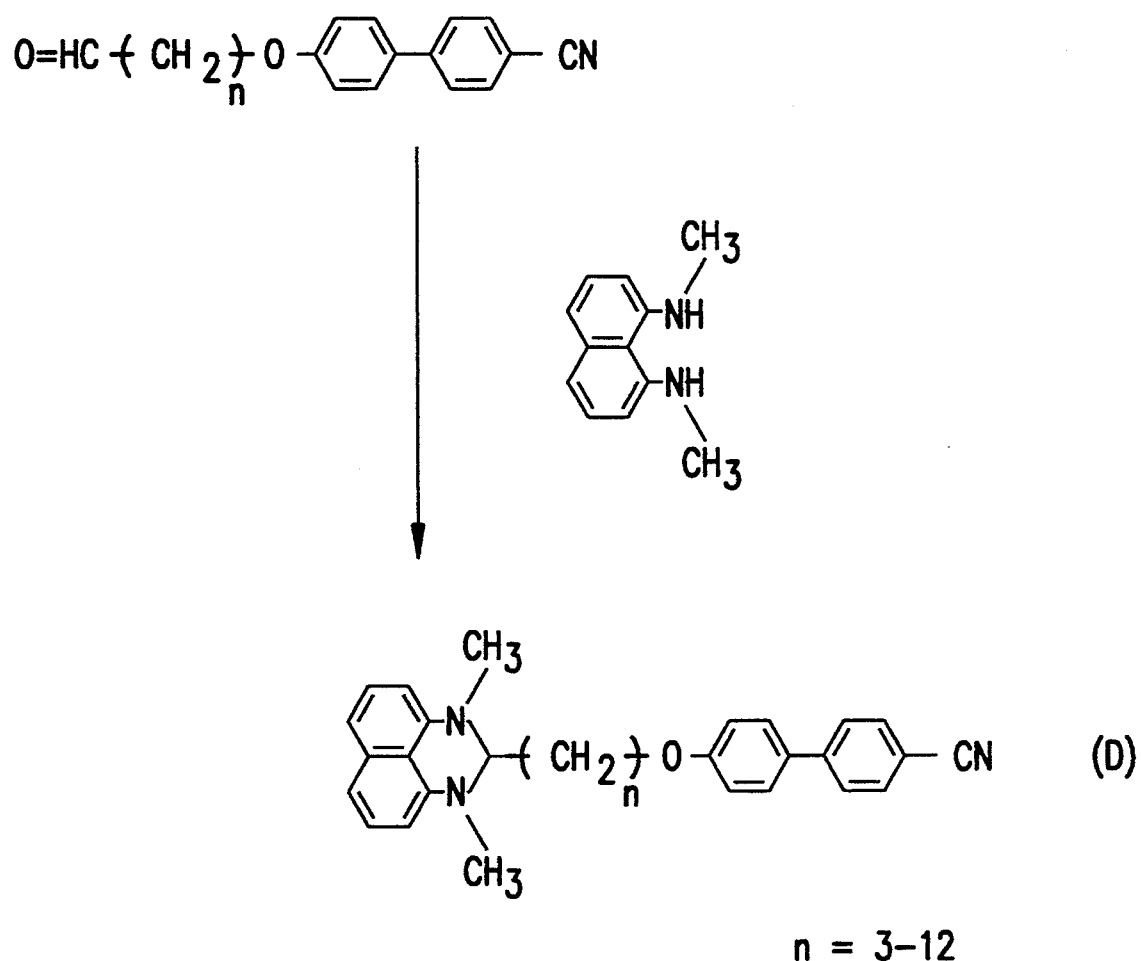

Aromatic amines are then alkylated with the liquid crystal coupling agent via their amide potassium salts as exemplified in Scheme 2 (FIG. 5). Amines also can be condensed with aldehyde liquid crystal coupling agents to form imines which can undergo reduction to give liquid crystal coupled aromatic amines. Condensation of 1,8-diamino naphthalene or N,N'-dialkyl-1,8-diamino napthalene with aldehyde liquid crystal coupling agents can form liquid crystal coupled 2,3-dihydroperimidines (D) as exemplified in Scheme 3 (FIG. 6).

Figure 7:
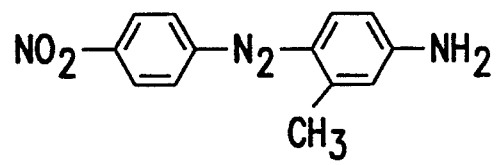
Figure 7:
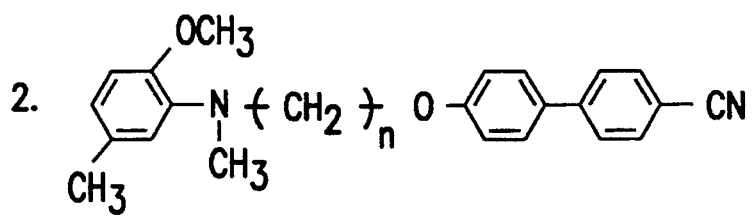
Figure 7:
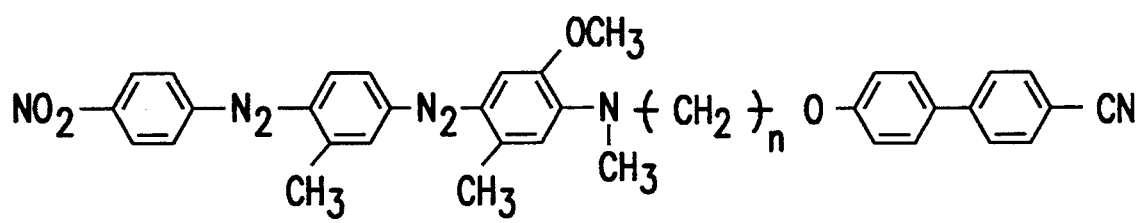

The liquid crystal coupled aromatic amines can be used in coupling to a wide variety of diazonium ions to give liquid crystal coupled azo and poly(azo) dyes as exemplified by Scheme 4 (FIG. 7).

Figure 8:
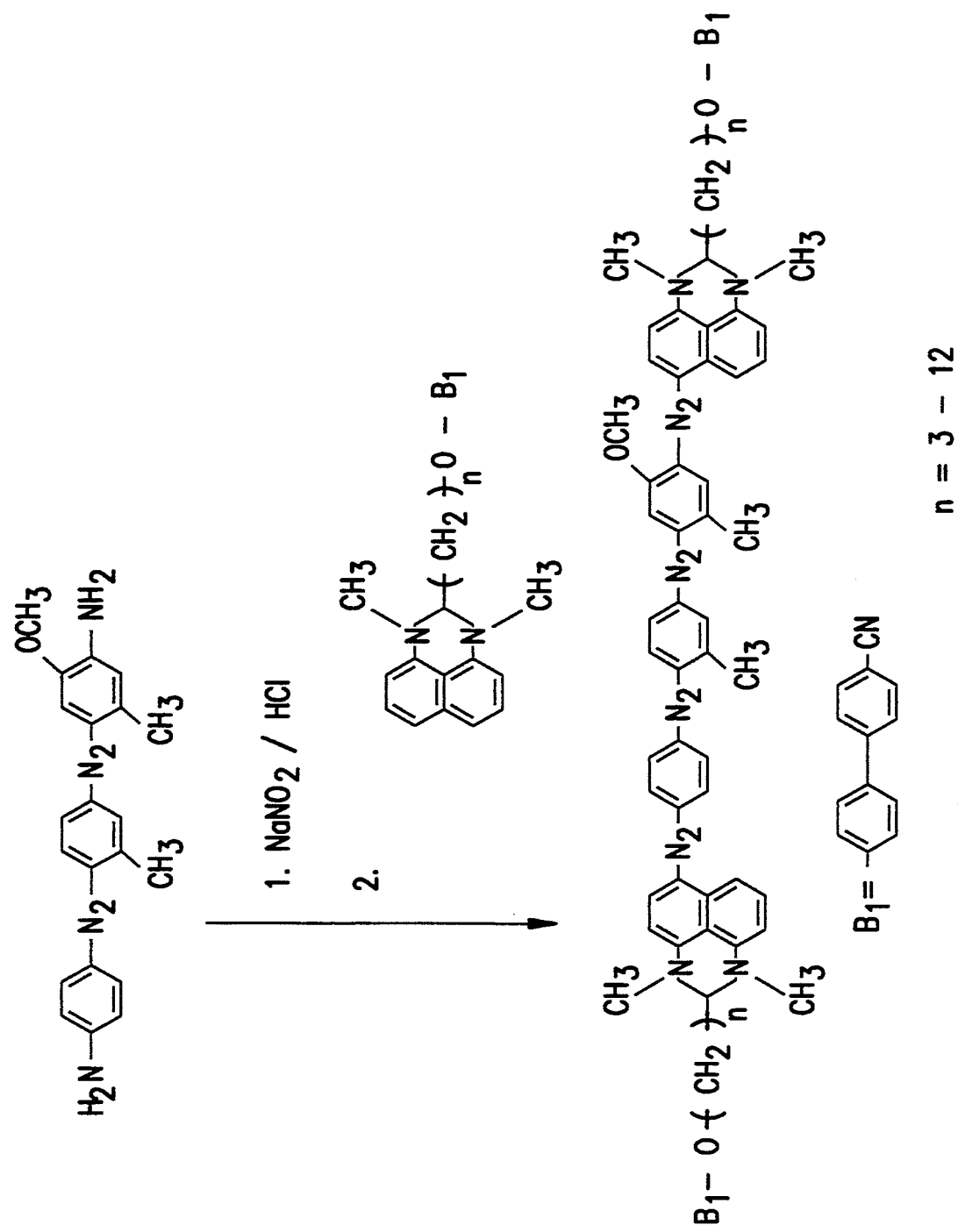

Bis liquid crystal coupled dyes can be obtained by coupling two equivalents of the liquid crystal coupled aromatic amine with a bis-diazonium ion as exemplified by Scheme 5 (FIG. 8).

Figure 9:
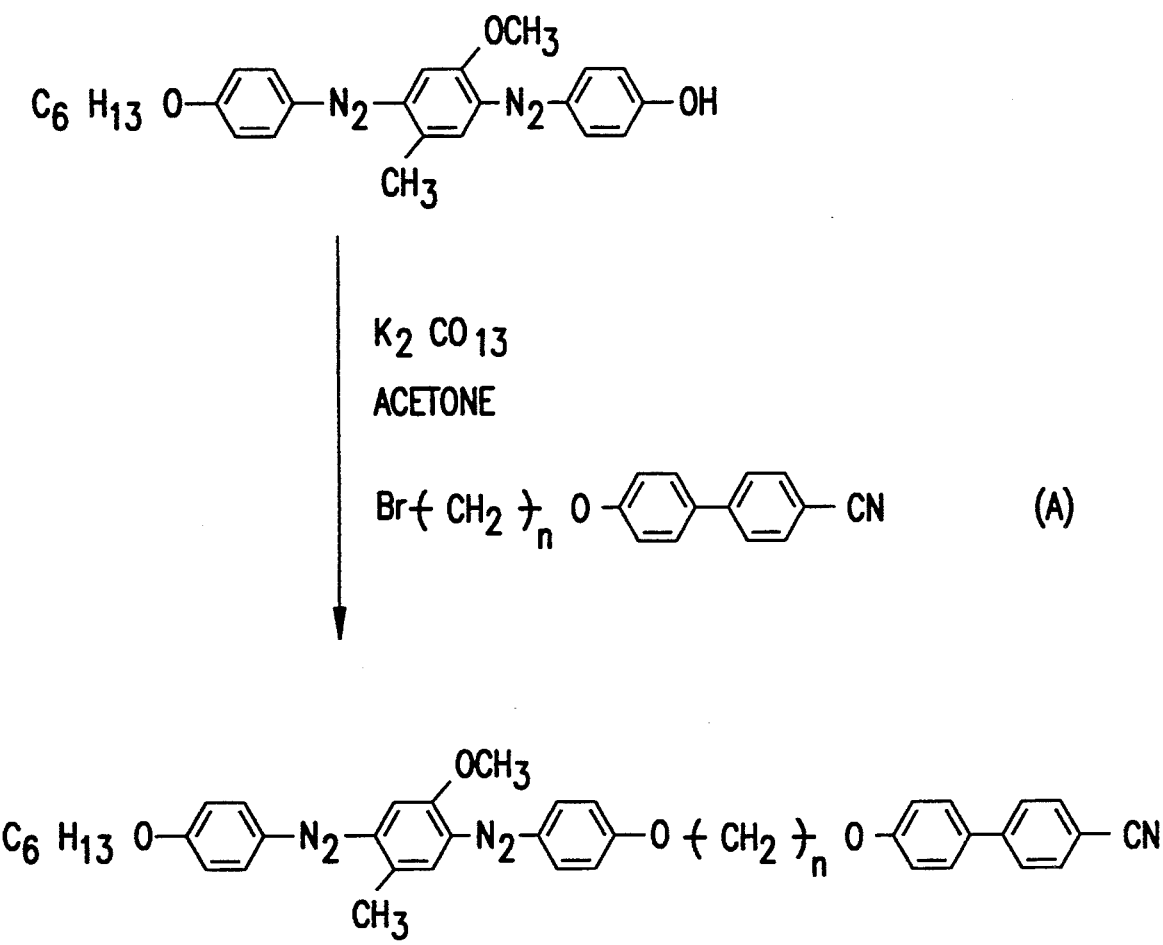

Alternatively, liquid crystal coupled azo and poly(azo) dyes can be obtained from hydroxy terminated azo chromophores by alkylation with bromide liquid crystal coupling agents (A) as exemplified by Scheme 6 (FIG. 9).

Figure 10:
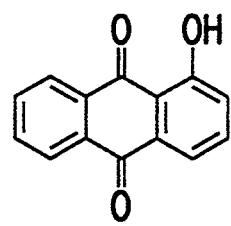
Figure 10:
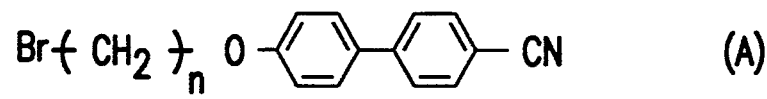
Figure 10:
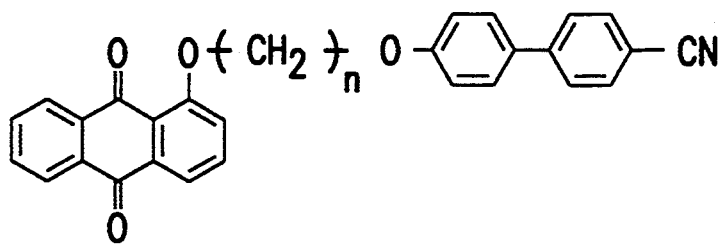

Liquid crystal coupled anthraquinone dyes can be prepared by alkylation of hydroxy-substituted anthraquinones with bromide liquid crystal coupling agents (A) as exemplified by Scheme 7 (FIG. 10).

Figure 2:
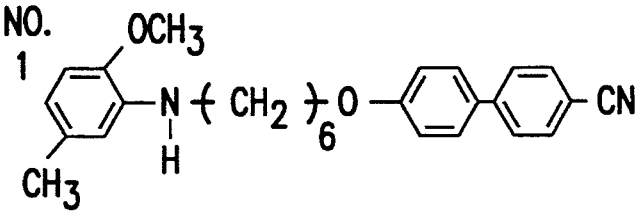
FIGS. 2 and 3 show exemplarily liquid crystal coupled aromatic amines and dyes.
Figure 2:
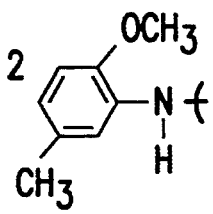
Figure 2:
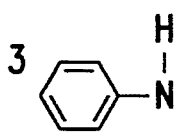
Figure 2:
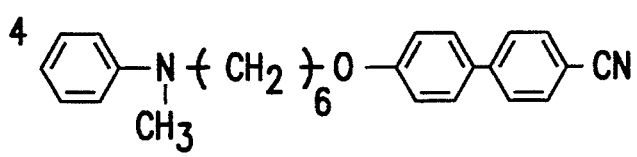
Figure 2:
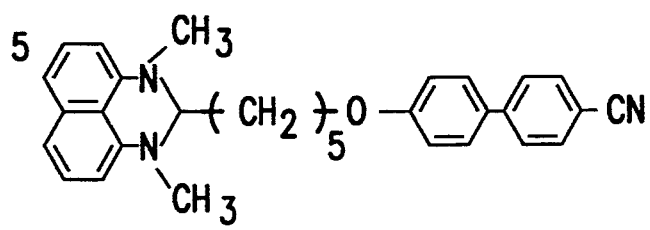
Figure 2:
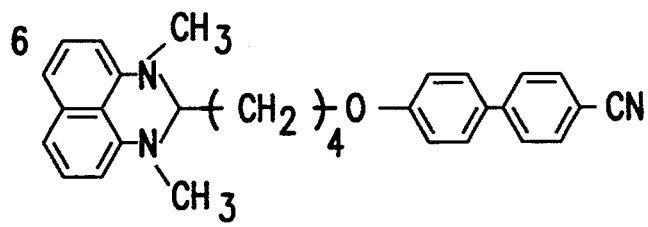
Figure 2:
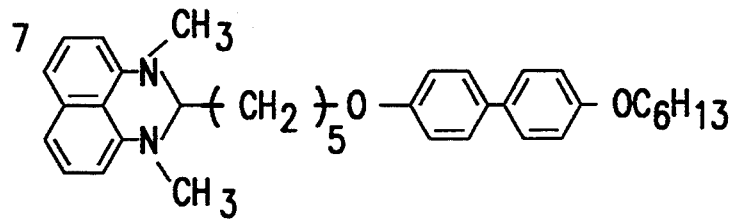
Figure 3:
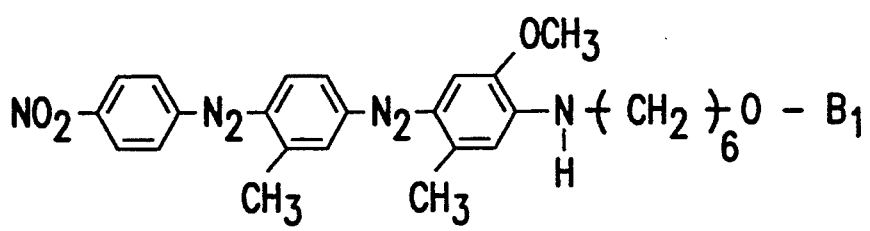
Figure 3:
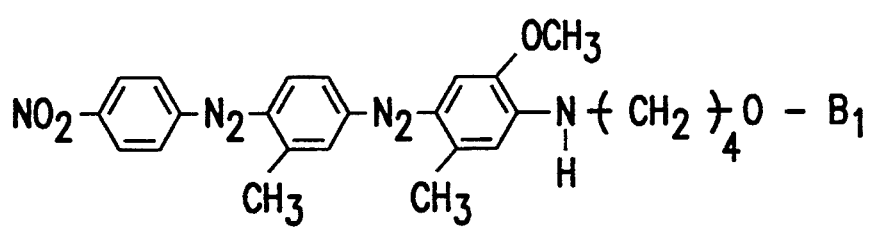
Figure 3:
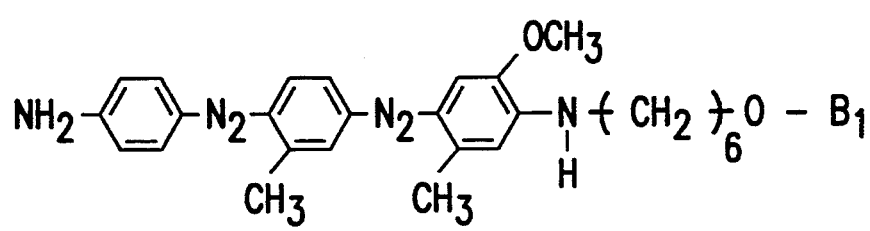
Figure 3:
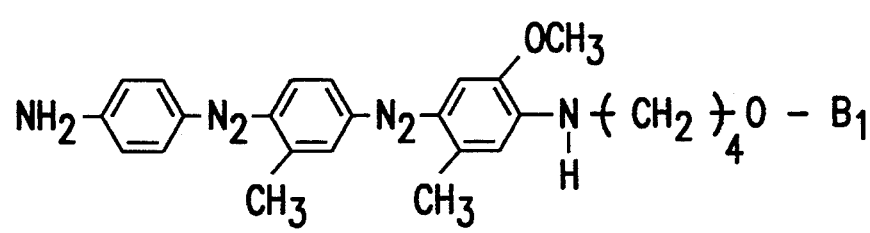
Figure 3B:
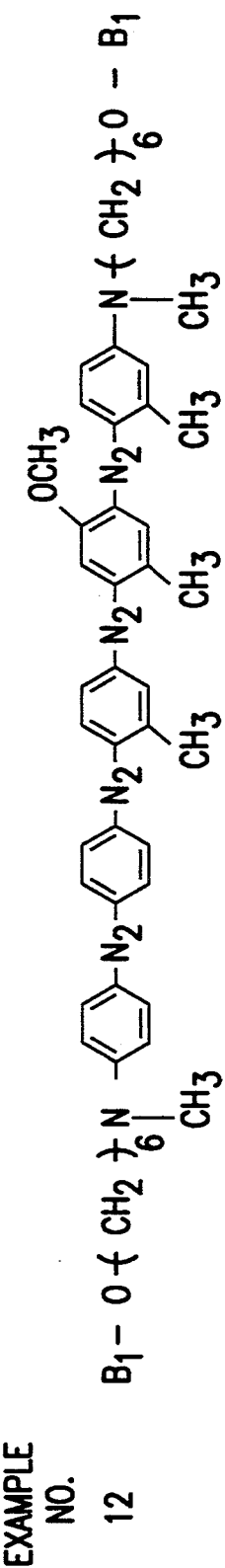
Figure 3B:
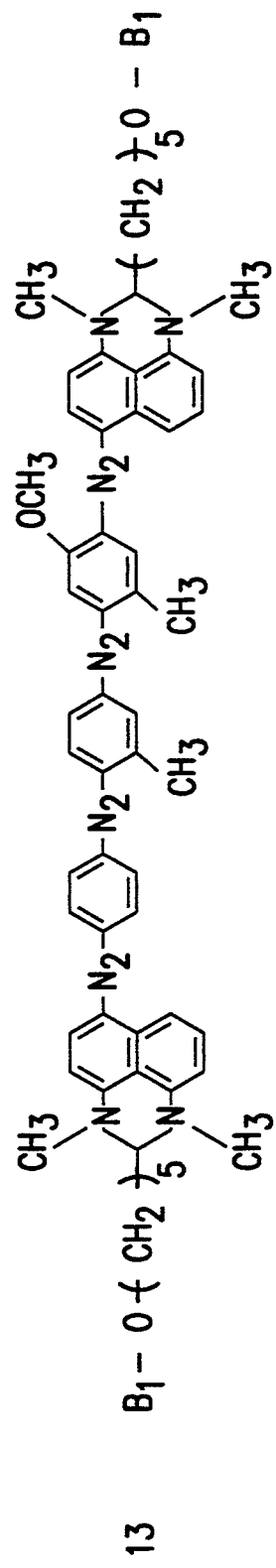
Figure 3B:
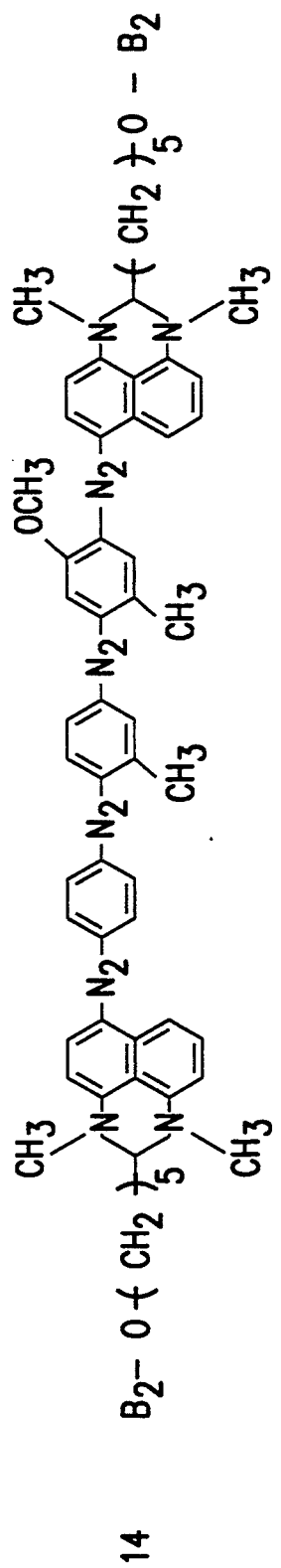
Figure 3C:
Figure 3C:
Figure 3D:
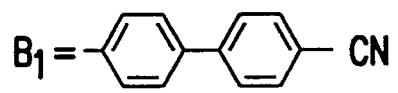
Figure 3D:
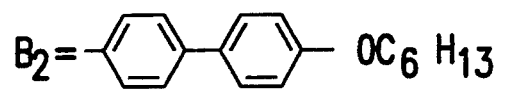

FIGS. 2 and 3 show several liquid crystal coupled aromatic amines and dyes prepared by the synthetic steps outlined above.

The dyes of this invention are useful in guest-host liquid crystal mixtures comprising at least one liquid crystal and at least one liquid crystal coupled dichroic dye soluble in the liquid crystal. Such guest-host mixtures may also contain one or more dichroic dyes soluble in the liquid cyrstal(s). Herein, the term "liquid crystal" is used to refer to molecules with anisotropic geometry, such as rod-shaped or disc-shaped, that exhibit stable states intermediate between liquid and solid, and which have low molecular weights. The liquid crystal medium of this invention may contain any such liquid crystal compound useful in liquid crystal devices, e.g., liquid crystal displays, or a mixture of such liquid crystal compounds. Useful are thermotropic liquid crystals which exhibit nematic and smectic (including ferroelectric) phases.

Nematic phases include conventional uniaxial nematics, twisted nematic, and cholesteric mesophases. The nematic liquid crystals can have either positive or negative dielectric anisotropy. As used herein the terms "positive" and "negative" refer to the net dielectric anisotropy of a mixture comprising liquid crystals.

Readily available positive nematic liquid crystal materials which are suitable for the practice of this invention include:
4-cyano-4'-alkylbiphenyls, 4-cyano-4'-alkyloxybiphenyls,
4-alkyl-(4'-cyanophenyl)cyclohexanes,
4-alkyl-(4'-cyanobiphenyl)cyclohexanes,
4-cyanophenyl-4'-alkylbenzoates,
4-cyanophenyl-4'-alkyloxybenzoates,
4-alkyloxyphenyl-4'cyanobenzoates,
4-alkylphenyl-4'cyanobenzoates,
1-(4'-alkylphenyl)-4-alkylpyrimidines,
1-(4'-alkylphenyl)-4-cyanopyrimidines,
1-(4'-alkyloxyphenyl)-4-cyanopyrimidines and
1-(4-cyanophenyl)-4-alkylpyrimidines.
Specific examples of within these families are:
4-cyano-4'-pentylbiphenyl,
4-cyano-4'-hexyloxybiphenyl,
trans-4-pentyl-(4'-cyanophenyl)cyclohexane,
trans-4-hexyl-(4'-cyanobiphenyl)cyclohexane,
4-cyanophenyl-4'-propylbenzoate,
4-pentyloxyphenyl-4'-cyanobenzoate,
4-hexylphenyl-4'-cyanobenzoate,
1-(4'-pentylphenyl)-4-butylpyrimidine,
1-(4'-butyloxyphenyl)-4-cyanopyrimidine,
1-(4-cyanophenyl)-4-alkylpyrimidine,
4-n-hexylbenzylidene-4'-aminobenzonitrile and
4-cyanobenzylidene-4'-octyloxyaniline.

Eutectic mixtures and combinations of all the above are also useful. Illustrative are eutectic mixtures of 4'-alkyl-4-cyanobiphenyls with either 4'-alkyloxy-4-cyanobiphenyls wherein the 4' substituents have 3 to 8 carbons or terphenyl liquid crystals with 4-alkyl or alkyloxy substituents containing 3 to 8 carbon atoms. Representative are the commercially available E7 mixture from BDH, Ltd., Poole, England; ROTN 404, a eutectic mixture of biphenyl pyrimidine liquid crystals from Hoffman La Roche, Nutley, N.J. PCH 1132, a mixture comprising the 4-alkyl-(4'cyanobiphenyl)cyclohexanes and 4-alkyl-(4'-cyanophenyl)cyclohexanes from EM Industries, Hawthorne, N.Y.; and ZLI 1982, also available from EM Industries.

Representative of nematic liquid crystals having negative dielectric anisotropy that would be useful for this invention include: 4-alkyloxy-4'-alkyloxyazoxybenzenes, 4-alkyl-4'-alkyloxyazoxybenzenes, 4-alkyl-4'-acyloxyazoxybenzenes, 4-alkyl-4'alkylazoxybenzenes and 4-alkyl-2-cyanophenyl-4'-alkylbiphenyl-1-carboxylates.

Specific examples include:
p-azoxyanisole, 4-butyl-4'-hexyloxyazoxybenzene,
4-butyl-4'-acetoxyazoxybenzene, 4,4'-bis(hexyl)azoxybenzene,
and 4-pentyl-2-cyanophenyl-4'-heptylbiphenyl-1-carboxylate.

Commercially available are Licristal S1014 from EM Industries, Hawthorne, New York; and EN-18 from Chisso Corp, Yokohama, Japan.

Conventional nematic formulations can be made into twisted nematic (chiral nematic) phases by addition of chiral (optically active) materials to the nematic composition. Typically a nematic liquid crystal having a chiral moiety attached is added to the nematic composition in a range of 1–20 wt %. The nematic composition undergoes a spontaneous twisting of the packing in the presence of the chiral dopant to give a helical array of molecules. The twisted nematic phase gives high contrast in a guest-host display.

Representative of families of optically active liquid crystals useful in the preparation of twisted nematic mesophases for this invention are 4-cyano-4'-alkylbiphenyls, 4-cyano-4'-alkyloxybiphenyls and cholesteryl alkanoates. Typical examples of optically active liquid crystals are 4-cyano-4'-(2-methylbutyl)biphenyl and 4-cyano-4'-(2-methylbutyloxy)biphenyl, available from BDH Limited (Poole, England) under the tradenames CB15 and C15, respectively; and cholesteryl nonanoate, available from F. Hoffmann-LaRoche Company (Basle, Switzerland).

Smectic A liquid crystals useful in this invention can be of either positive or negative dielectric anisotropy. Smectic A liquid crystals of positive anisotropy include: 4-alkyl-4'-cyanobiphenyls and 4-cyano-4'-alkylbenzylideneanilines, as well as mixtures of 4-alkyl-4''-cyano-p-terphenyls and 4-alkyl-4''-cyanobiphenyls. Also useful are smectic A mixtures derived from electron accepting and electron donating mesogenic cores, for example 4'-alkylphenyl 4-alkylbenzoates and 4'-cyanophenyl-4''-alkyloxybenxoyloxybenzoates. Specific examples of compounds useful as smectic A liquid crystals with positive dielectric anisotropy are: 4-cyano-4'-octylbenzylideneaniline, 4-decyl-4'- cyanobiphenyl, 4-dodecyl-4"-cyano-p-terphenyl, 4'-heptylphenyl-4-butylbenzoate and 4'-cyanophenyl-4"-octyloxybenzoyloxybenzoate. Eutectic mixtures and combinations of all the above smectic A materials are useful. Representative eutectic mixtures and combinations of smectic A liquid crystals are the commercially available materials S1, S2, S3, S4, S5, S6 and S7, from EM Industries, Hawthorne, N.Y.

Representatives of smectic A liquid crystals of negative dielectric anisotropy that are useful in this invention are 4-alkylphenyl-4-alkyloxy-3-cyanobenzoates, 4-alkyloxyphenyl-4-alkyloxy-3-cyanobenzoates and 4"-alkyloxyphenyl-4'-alkyloxybenzoyloxy-3-cyanobenzoates.

Specific examples include:
4'-octylphenyl-4-decyloxy-3-cyanobenzoate,
4'-decyloxyphenyl-4-octyloxy-3-cyanobenzoate and
4'-heptyloxyphenyl-4'-decyloxybenzoyl-3-cyanobenzoate.

Eutectic mixtures of these may also be used.

Representative chiral smectic C liquid crystals useful in the practice of this invention include:
4'-alkyloxyphenyl-4-alkyloxybenzoates,
4'-alkyloxybiphenyl-4-alkyloxybenzoates,
4-alkyloxyphenyl-4-alkyloxybiphenylcarboxylates and terpenol esters of 4'-n-alkyloxybiphenyl-4-carboxylates.

Specific examples are:
4(4-methylhexyloxy)phenyl-4-decyloxybenzoate,
4-heptyloxyphenyl-4(4-methylhexyloxy)benzoate,
4'-octyloxybiphenyl-4(2-methylbutyloxy)benzoate,
4-nonyloxyphenyl-4'-(2-methylbutyloxy)biphenyl-4-carboxylate, and methyl 4'-n-octyloxybiphenyl-4-carboxylate.

Commercially available mixtures of chiral smectic C liquid crystals include the CS 1000 series offered by Chisso Corp., Yokohama, Japan; ZLI 4139, available from EM Industries, Hawthorne, N.Y.; and the eutectic mixtures of laterally fluorinated esters developed by BDH, LTD., and available through EM Industries as the SCE series of eutectic mixtures SCE3 through SCE12. Single component chiral smectic C materials based on 4'-alkyloxyphenyl-4-alkyloxybenzoates, W7, W37, W81, and W82 are available from Displaytech, Inc., Boulder, Colo.

Preferred are nematic liquid crystal hosts.

In general, the coupling of liquid crystal moieties to the dyes through flexible spacers has little influence on the color or intensity of the dye chromophore.

The liquid crystal coupled dichroic dyes of this invention have relatively high values of the optical order parameter S in nematic hosts. The order parameters of the liquid crystal coupled dyes are uniformly higher than those of the unmodified dyes. Order parameter is a measure of the efficiency with which the liquid crystal coupled dichroic dye is oriented by the liquid crystal material and is directly related to the contrast observed when viewing a liquid crystal device is directly related to the order parameter. In general, dyes having high optical order parameters produce devices having high contrasts. Optical order parameter is calculated by using the following formula:

$$S = \frac{D-1}{D+2}$$

wherein $D = A_{\parallel}/A_{195}$, $A_{\parallel}$ is the maximum absorption measured in the presence of a polarizer and $A_{\perp}$ is the absorbance when the polarizer is rotated 90 degrees from the initial positions. S is a value less than 1 and is preferably very close to 1. In nematic hosts, the dyes of this invention have values of S greater than about 0.66, ensuring optical contrast ratios on the order of at least 7:1. Preferred dyes have, in nematic hosts, S values greater than about 0.75, and most preferably about 0.78 or higher.

In general, the coupling of liquid crystal moieties to dyes through flexible spacers leads to uniformly higher order parameters. For instance, the diazo diamine

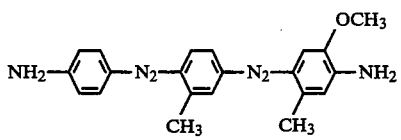

has an order parameter of 0.56 in ZLI 1982 nematic host. The liquid crystal coupled dye in Example 10 has an order parameter of 0.68.

The dyes of this invention are soluble in the aforementioned liquid crystals. Solubility is determined by dissolving excess dye in a host solvent and determining the dye concentration of the filtered solution by dilution in chloroform and comparing the visible spectrum of the solution with that of known standards. In general, useful dyes should have a solubility greater than 0.5 wt % in the liquid crystal host.

The coupling of liquid crystal moieties to dyes through flexible spacers can dramatically increase the solubility of the dyes. For instance, the liquid crystal coupled dye of Example 12 has a solubility in ZLI 1982 of 13.9 wt %. In other cases, coupling of liquid crystal moieties to dye chromophores decreases the solubility to some extent. For instance, the above mentioned diazo diamine has a solubility in ZLI 1982 nematic host of 1.37 wt %. The liquid crystal coupled dye of Example 10 has a solubility of 0.64 wt %. The solubility is still high enough for the dye to be useful in a guest-host mixture.

In guest-host mixtures, the dyes of this invention may be used in combination with other dyes. Dyes useful in these mixtures include dichroic azo, diazo, triazo, tetraazo, pentaazo, anthraquinone, mericyanine, methine, 2-phenylazothiazole, 2-phenylazobenzthiazole, 4,4'-bis-(arylazo)stilbenes, perlyne and 4,8-diamino-1,5-naphtaquinone dyes, and other dyes that exhibit dichroic absorption bands.

Black dye formulations using dyes of this invention are preferred for guest-host displays because a black color offers the highest viewing contrast. However, other colored displays such as red, blue or green, may be desirable and can be prepared by adjusting the dye formulation in the liquid crystal mixture.

Guest-host systems made with the dyes of this invention are useful in liquid crystal display devices having conventional configurations (e.g., two, three or more substrate structures) and may include one or more polarizers, lighting means, reflective or transflective layers, alignment layers, elastomeric connectors and circuit boards as conventionally used in the art. Other conventional materials such as conducting ionic dopants, chiral dopants, photostabilizers and viscosity modifiers, etc., may be used.

For nematic formulations, it is preferable to formulate a guest-host composition which has a chiral dopant.

Such a formulation in a planar texture in the display will absorb all polarizations of light impinging on the display, providing high contrast and brightness with wide viewing angle in the absence of polarizers.

An electronic liquid crystal display suitable for the guest-host mixture of this invention is shown in FIGS. 11 through 14. The display is depicted as having two substrates, 1 and 10, such as glass, at least one of which must be transparent so as to permit passage of light.

Substrates 1 and 10 are joined together at their perimeters by adhesive layer 5 thereby forming a thin cell 6 which is filled with the guest-host mixture. That is, selected dyes are mixed in the liquid crystal host, usually at elevated temperatures. The solutions are filtered to remove insolubles and the solutions are allowed to fill the display cells by capillary action.

Figure 11:
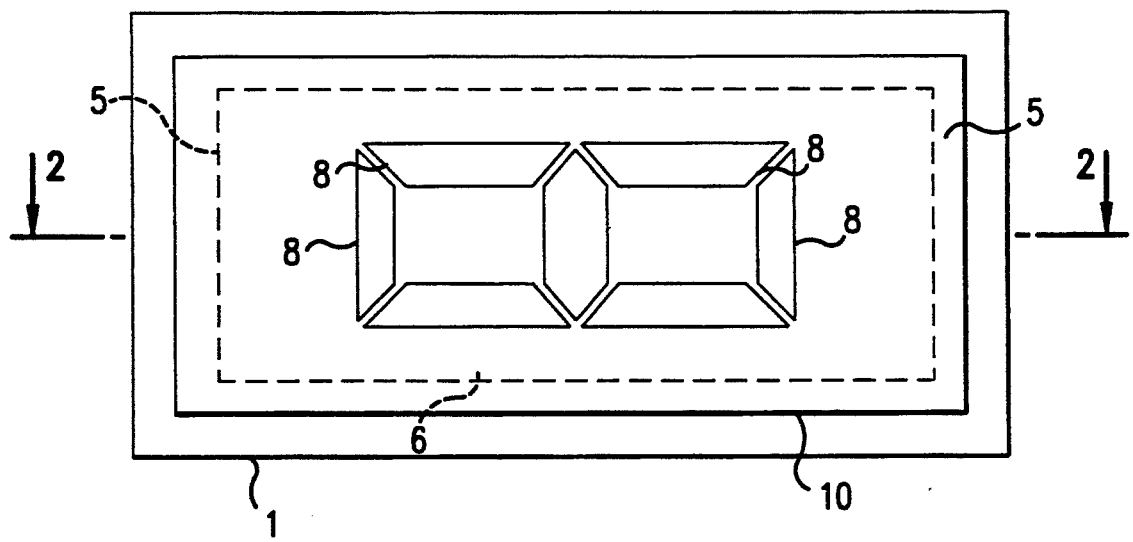
FIGS. 11–14 show a typical liquid crystal display.
Figure 12:
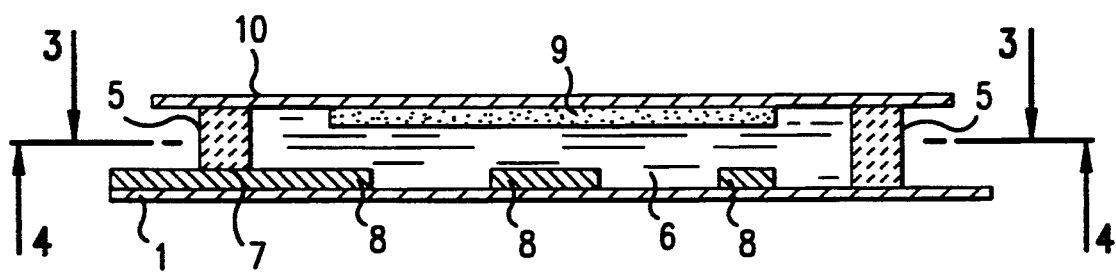
Figure 13:
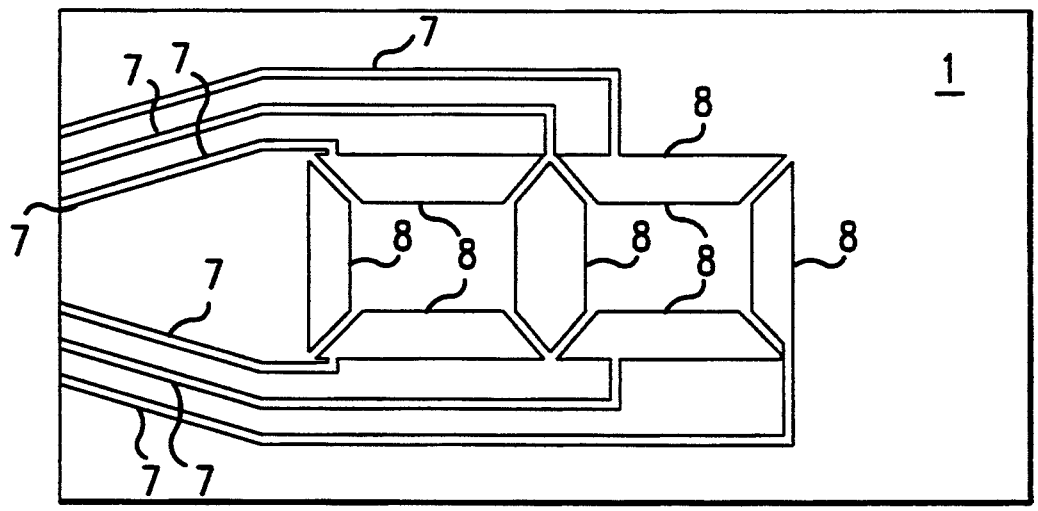
Figure 14:
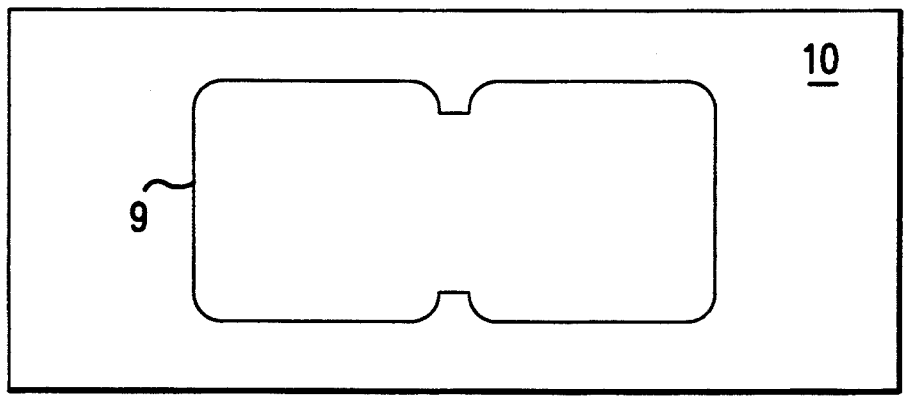

The interior side of each substrate is selectively coated with transparent electrical conductive material, e.g., tin oxide or, preferably, indium tin oxide, so that an electric impulse may be applied to the interior of the display device. In FIGS. 11, 12 and 13, the electrically conductive material on substrate 1 is shown as two components, i.e., electrical leads 7 and symbol-forming patterns 8. Electrical leads 7 provide a means for conducting an electrical current to the figure-forming patterns 8. Figure-forming patterns 8 form one electrode which, along with electrically conductive-coating 9 on substrate 10, form two electrodes which allow voltage to be applied across the thin layer of guest-host material 6 to turn on the individual pixels. Not shown are alignment layers, which are generally thin polymer coatings comprising polyamides, polyimides or other such materials.

Liquid crystal displays of this type are often used in modules containing lighting means (e.g., incandescent or electroluminescent lights), electronic chips and reflectors or transflectors. The reflectors and transflectors may be adhered to a substrate of the display.

Such guest-host systems are useful for other liquid crystal devices, e.g., all-optical light modulators, erasable read/write optical data storage media, etc. The liquid crystal coupled dyes themselves are also useful in textiles, printing, color filters, polarizers, paints, electro-optical modulators, etc.

The advantages and attributes of the present invention will become more apparent from the following examples which are intended to illustrate but not to limit the scope of the present invention. In the examples, all percentages, parts, etc., are by weight, unless otherwise specified. The liquid crystal coupled amines prepared in Examples 1-7 and liquid crystal coupled dichroic dyes prepared in Examples 8-19 are shown in FIGS. 2 and 3, respectively.

The liquid crystal materials used in the examples are ZLI 1982, a nematic mixture with an isotropic transition of 90° C. (EM Industries, Hawthorne N.Y.); ZLI 2452, a nematic mixture with an isotropic transition of 110° C. (EM Industries); CS 1018, a chiral smectic C (ferroelectric) mixture (Chisso Corp., Yokohama, Japan); and 4'-hydroxy-4-cyanobiphenyl (CTC Organics, Atlanta, Ga.). All of the other starting materials were purchased from Aldrich Chemical Co., Inc., Milwaukee, Wisconsin, and were used without purification unless otherwise indicated.

EXAMPLE 1

This example illustrates the formation of the liquid crystal coupled aromatic amine 1 by alkylation of 2-methoxy-5-methylformanilide with 4'-(6-bromohexyloxy)-4-cyanobiphenyl followed by hydrolysis.

A mixture of 4'-hydroxy-4-cyanobiphenyl (7.8 g, 40 mmol), potassium carbonate (8.3 g, 60 mmol), 1,6-dibromohexane (29.8 g, 120 mmol), and acetone (80 milliliters ("mL")) was heated to reflux for 6 hours ("h") under a nitrogen atmosphere. The acetone was concentrated and the residue dissolved in ether-dichloromethane (4:1, 400 mL). The solution was filtered through glass fiber. The filtrate was washed with water and brine, dried over magnesium sulfate, and concentrated. Excess 1,6-dibromohexane was removed by Kugelrohr distillation up to 75° C. at 0.1 mm Hg. The material remaining in the pot was recrystallized from ethanol (100 mL), filtered while hot, and cooled in the freezer to give crystals of the 4'-(6-bromohexyloxy)-4-cyanobiphenyl (9.6 g, 67%): melting point ("mp") 65.5–66° C., nematic mesophase at 63° C. in cooling; NMR (CDCl$_3$) 7.55(s, 4H), 7.49(d, 2H), 6.82(d, 2H), 3.91(t, 2H), 2.0–1.3(m, 8H); IR (CH$_2$Cl$_2$) 2222, 1602 cm$^{-1}$.

A solution of acetic anhydride (40.8 mL) and 98% formic acid (17.2 mL) was heated to 50–60° C. for 2 h in an oil bath. The mixture was cooled in ice and a solution of 2-methoxy-5-methyl aniline (27.4 g, 0.2 mol) in dichloromethane (100 mL) was added in a slow stream. The mixture was warmed to room temperature and stirred 2 h. The mixture was diluted with ether (400 mL) and washed with excess saturated sodium carbonate solution. The ether phase was washed with brine, dried (MgSO4) and concentrated to a solid. The solid was recrystallized from ethyl acetate-hexane (1:2, 375 mL) to give 2-methoxy-5-methylformanilide (24.9 g, 73%): mp 85–87° C.; $^1$H NMR (CDCl$_3$) 8.6 and 8.2(d of d, 2H), 7.75(bs, 1H), 7.0–6.6(m, 2H), 3.8(s, 3H), 2.26(s, 3H); IR (CH$_2$Cl$_2$) 3280, 1665, 1595 cm$^{-1}$.

Potassium hydride oil dispersion (0.68 g, 35 wt %, 0.24 g KH, 6 mmol) was weighed into an oven dried 100 mL flask and washed two times with 3 mL portion of hexane. Dry dimethylforamide (2 mL) was added, followed by addition of a solution of 2-methoxy-5-methylformanilide (0.99 g, 6 mmol) in dimethylforamide (4 mL). A partially insoluble potassium salt formed, so an additional portion of DMF (8 mL) was added and the mixture was stirred at room temperature for 0.5 h, followed by heating to 60° C. for 0.5 h. A solution of the above bromide (1.79 g, 5 mmol) in DMF (4 mL) was added all at once at room temperature and the mixture was stirred for 1.75 h at room temperature. Then, the mixture was diluted with water (100 mL) and 2 M HCl (3 mL) and extracted with ether-dichloromethane (4:1, 200 mL). The crude product was hydrolyzed by dilution with ethanol (15 mL) and 2.5 N HCl (15 mL), and heated to reflux for 18 h. The mixture was concentrated to remove ethanol, and the residue was basified with saturated sodium carbonate solution and extracted with ether-dicloromethane (4:1, 200 mL). The extracts were washed with water and brine solution, dried (MgSO$_4$) and concentrated to a beige solid (2.0 g). Recrystallization from ethyl acetate-hexane (1:2, 50 mL) gave aniline 1 (1.40 g, 67%):mp 80–83° C.; $^1$H NMR (CDCl$_3$) 7.58(s, 4H), 7.3(d, 2H), 6.85(d, 2H), 6.43(m, 3H), 3.93(t, 2H), 3.76(s, 3H), 3.70(bs, 1H), 3.08(t, 2H), 2.24(s, 3H), 1.9–1.35(m, 8H); IR (KBr) 3500–3400, 2225, 1601, 1581, 1522 cm$^{-1}$.

EXAMPLE 2

This example illustrates the formation of liquid crystal coupled aniline 2 by alkylation of 2-methoxy-5-methylformanilide with 4'-(4-bromobutyloxy)-4-cyanobiphenyl, followed by hydrolysis.

A solution of 4'-hydroxy-4-cyanobiphenyl (11.7 g, 60 mmol) was treated with 1,4-dibromobutane (38.9 g, 0.18 mol, 216) as described in Example 1. Recrystallization of the product from ethanol gave 4'-(4-bromobutyloxy)-4-cyanobiphenyl (6.15 g, 31%): mp 62.5–64° C.; 1H NMR (CDCl$_3$) 7.52(s, 4H), 7.41 and 6.83(2d, 4H), 3.95(t, 2H), 3.42(t, 2H), 1.97(m, 4H); IR (KBr) 2225, 1605, 1581 cm$^{-1}$.

Treatment of 2-methoxy-5-methylformanilide (4.95 g, 30 mmol) with potassium hydride and the above bromide as described for the preparation of aniline 1, gave a solid that was recrystallized from ethyl acetate-hexane (1:2) to give aniline 2 (5.8 g, 60%): mp 95–96.5° C.; 1H NMR (CDCl$_3$) 7.52(s, 4H), 7.48(d, 2H), 6.83(d, 2H), 3.72(s, 3H), 3.14(m, 2H), 2.2(s, 3H), 1.90(m, 4H); IR (KBr) 3375, 2223, 1602, 1580, 1521 cm$^{-1}$.

EXAMPLE 3

This example illustrates the formation of liquid crystal coupled aniline 3.

Potassium hydride oil dispersion (6.8 g, 35 wt %, 2.4 g KH, 60 mmol) was weighed into an oven dried 250 mL three neck flask and washed two times with 30 ml portions of hexane. The hexane washes were decanted and dry dimethylformamide (60 mL) was added followed by addition of solid acetanilide (8.1 g, 60 mmol) in portions over 5 minutes ("min"). After 15 min at room temperature a red-brown solution had formed. The bromide from Example 1 (17.9 g, 50 mmol) in dimethylformamide (40 mL) was added in a rapid stream and the mixture was stirred for 0.5 h at room temperature. Then, the mixture was diluted with water (500 mL) and 5 N hydrochloric acid (10 mL), extracted with ether-dichloromethane (4:1,300 mL), and the extracts were dried over sodium sulfate. The extracts were concentrated to an oil (24.7 g) and recrystallized from ethanol (200 mL) to give a beige crystalline amide (16.2 g, 79 wt %, mp 88.5–90° C.). Next, the acetanilide intermediate (12.36 g, 30 mmol, 412), 3 N hydrochloric acid (72 mL) and ethanol (72 mL) were heated to reflux in an oil bath for 70 h. Upon cooling to room temperature a white solid formed. The solid was dissolved in dichloromethane (300 mL) and washed with saturated sodium carbonate and water. The extract was dried with magnesium sulfate and concentrated to a solid (10.5 g). The solid was recrystallized from ethyl acetate-hexane (1:1) to give aniline 3 (8.4 g, 76%): mp 113–117° C.; 1H NMR (CDCl$_3$) 7.54(s, 4H), 7.38 and 6.86 (2d, 4H), 7.02 and 6.55(2m, 5H), 3.91(t, 2H), 3.18(s, 1H), 3.02(t, 2H), 1.9–1.3(m, 8H); IR (CH$_2$Cl$_2$) 3400, 2222, 1604 cm$^{-1}$.

EXAMPLE 4

This example illustrates the formation of liquid crystal coupled aniline 4.

Sodium borohydride (1.35 g, 35 mmol) was suspended in a solution of the aniline 3 (3.70 g, 10 mmol) in tetrahydrofuran (40 mL) and added, via pastuer pipet in 1 mL portions, to a solution containing 3 M sulfuric acid (4.0 mL), 37% formaldehyde (2.3 mL. 30 mmol) and tetrahydrofuran (5 mL) in a 125 mL erlynmeyer flask cooled to 0° C. in an ice methanol bath. The addition was controlled to maintain the temperature below 10° C. After the addition was complete (5 min), the mixture was stirred 15 min while warming to room temperature. The mixture was basified with 25% sodium hydroxide solution, diluted with water, and extracted with ether. The extracts were washed with water, dried over potassium carbonate and concentrated to an oil (5.2 g). Flash chromatograph with hexane-ether (5:1) gave a white solid (2.65 g, 57%): mp 65–67° C.; 1H NMR (CDCl$_3$) 7.6–6.5(m, 13H), 3.92(t, 2H), 3.28(t, 2H), 2.88(s, 3H), 1.9–1.3(m, 8H); IR (CH$_2$Cl$_2$) 2240, 1615 cm$^{-1}$.

EXAMPLE 5

This example illustrates the formation of liquid crystal coupled 2,3-dihydroperimidine 5 by oxidation of 4'(6-Hydroxyhexyloxy)-4-cyanobiphenyl to 4'(6-formylpentyloxy)-4-cyanobiphenyl, condensation of the aldehyde with 1,8-diamino naphthalene and reductive methylation.

At room temperature, potassium hydride (2.5 g, 35 wt % oil dispersion, 0.88 g KH, 22 mmol) was washed twice with hexane and suspended in DMF (30 mL), followed by addition of t-butyl alcohol (2.1 mL, 1.63 g, 22 mmol). 4'-Hydroxy-4-cyanobiphenyl (3.9 g, 20 mmol) was added as a solid all at once to give a deep yellow solution. The mixture was stirred 5 min at room temperature and the tetrahydropyran of 6-bromohexanol (5.8 g, 22 mmol) was added all at once with a mild exotherm. After 2 h, more bromide (1.0 g) was added and the reaction mixture was stirred for 1 h. The mixture was diluted with water, acidified with 5 N hydrochloric acid and extracted with ether-dichloromethane (4:1). An insoluble white solid had to be removed by filtration through glass fiber to obtain good separation of phases. The extracts were washed with water, dried (MgSO$_4$) and concentrated to a solid (7.7 g). The solid was stirred with tetrahydrofuran-2.5 N hydrochloric acid (4:1, 50 mL) overnight at room temperature and then heated to reflux for 2.0 h. The ethanol was removed and the aqueous phase was extracted with ether-dichloromethane (4:1). The extracts were washed with water, dried (MgSO$_4$) and concentrated to a solid that was recrystallized from ethanol-ether to give 4'-(6-hydroxyhexyloxy)-4-cyanobiphenyl: (3.25 g, 55%): mp 87–89° C., nematic phase 89–106° C.; 1H NMR (CDCl$_3$) 7.63(s, 4H), 7.46 and 6.90(2d, 4H), 3.97(t, 2H), 3.62(t, 2H), 1.9–1.3(m, 8H); IR (KBr) 3300, 2225, 1601, 1580, 1525 cm$^{-1}$.

To a solution of dimethyl sulfoxide (0.71 mL, 10 mmol) in dichloromethane (dried over 4 A sieves, 5 mL) was added trifluoroacetic anhydride (1.13 mL, 8 mmol. 1.68 g) over 10 min at −65° C. (acetone-dry ice bath). After stirring for 0.5 h at −65° C., the alcohol from above (1.47 g, 5 mmol) in dichloromethane (10 mL) was added to the mixture over 10 mins at −65° C. After stirring for 0.5 h, triethylamine (2 mL) was added to the mixture at −65° C. and the mixture was allowed to warm to room temperature for 2 h. The mixture was diluted with dichloromethane, washed with 0.5 N HCl, washed with water, dried (MgSO$_4$) and concentrated to an oil (1.70 g). Flash chromatography with hexane-THF (8:1) gave a 72:28 ratio (by 1H NMR) of the corresponding trifluoroacetate and the methyl thiomethyl ether of the alcohol (0.6 g) as by-products and 4'-(formylpentyloxy)-4-cyanobiphenyl (0.60 g, 41%): mp 75–77° C., nematic mesophase appeared during cooling at 74° C.; 1H NMR (CDCl$_3$) 9.7(s, 1H), 7.6(s, 4H), 7.42 and 6.9(2d, 4H), 3.97(t, 2H), 2.47(t, 2H), 1.9–1.4(m, 6H); IR (CHCl$_3$) 2220, 1717, 1600, 1575 cm$^{-1}$.

A solution of the above aldehyde (1.17 g, 4 mmol), distilled 1,8-diamino naphthalene (0.63 g, 4 mmol), p-toluenesulfonic acid (10 mg), and tetrahydrofuran (6 mL) was stirred for 0.5 h at room temperature. The mixture was basified with 1 mL saturated sodium carbonate, diluted with THF-ether (1:1) and washed with water. The extract was concentrated and the residual solid was recrystallized from THF-ether (1:1, 30 mL) to give the 2,3-dihydroperimidine (1.50 g, 87%): mp 165–167° C.; $^1$H NMR (CDCl$_3$) 7.59(s, 4H), 7.45 and 6.9(2d, 4H), 7.1(m, 4H), 6.4(d, 2H), 4.7(bs, 2H), 4.45(t, 1H), 4.0(t, 2H), 2.0–1.5(m, 8H); IR 3385, 3360, 2225, 1601 cm$^{-1}$.

Sodium borohydride (0.91 g, 24 mmol) was suspended in a solution of the above 2,3-dihydroperimidine (1.40 g, 3.24 mmol) in THF (15 mL) and added, via pastuer pipet in 1 mL portions, to a solution comprising 3 M sulfuric acid (4.8 mL), 37% formaldehyde (2.8 mL) and tetrahydrofuran (15 mL) in a 125 mL erlynmeyer flask cooled to 0° C. in a methanol-ice bath. This addition was carried out over 8 mins so that it could be controlled, to maintain the temperature below 10° C. The mixture was stirred a further 7 min, quenched with 25% sodium hydroxide (10 mL) and water (40 mL), and extracted with ether-dichloromethane (4:1). The extracts were washed with water and brine, dried over potassium carbonate and concentrated to a solid (1.70 g). Recrystallization from THF-ether (1:1, 15 mL) gave 2,3-dihydroperimidine 5 (1.36 g, 91%): mp 89–93° C.; $^1$H NMR (CDCl$_3$) 7.58(s, 4H), 7.5–6.7(m, 8H), 6.32(d, 2H), 4.25(t, 1H), 3.75(t, 2H), 3.0(e, 6H), 1.8–1.2(m, 8H); IR (KBr) 2230, 1595 cm$^{-1}$.

EXAMPLE 6

This example illustrates the formation of the liquid crystal coupled 2,3-dihydroperimidine 6 by oxidation of 4′-(5-hydroxypentyloxy)-4-cyanobiphenyl to 4′-(4-formylbutyloxy)-4-cyanobiphenyl, and condensation of the aldehyde with N,N′-dimethyl-1,8-diamino naphthalene.

First, 4′-(5-bromopentoxy)-4-cyanobiphenyl was prepared as follows. A solution of 4′-hydroxy-4-cyanobiphenyl (3.84 g, 20 mmol) was treated with 1,5-dibromopentane (9.2 g, 40 mmol) as described for the bromide in Example 1. Recrystallization of the product from ethanol gave the bromide (4.3 g, 62%): mp 76–78° C.; $^1$H NMR (CDCl$_3$) 7.52(s, 4H), 7.41 and 6.83(2d, 4H), 3.95(t, 2H), 3.40(t, 2H), 2.0–1.5(m, 6H); IR (KBr) 2225, 1605, 1580 cm$^{-1}$.

A solution of the bromide prepared above (4.36 g, 13 mmol), potassium acetate (2.6 g, 26 mmol) and dimethylformamide (40 mL) was stirred at 60–65° C. for 4 h. The solution was diluted with water (200 mL) and extracted with ether:dichloromethane, 4:1 (200 mL). The extract was washed with brine, dried over magnesium sulfate, and concentrated to a solid. The solid was recrystallized from ethanol to give 3.0 g (mp 82° C.) of the corresponding acetate. The acetate (5.06 g, 18 mmol) was hydrolyzed in tetrahydrofuranethanol, 2:1 (30 mL) with 5 M potassium hydroxide (5 mL) over 1.5 h at room temperature. The crude alcohol was recrystallized from ethanol to give 3.0 g of 4′(5-hydroxypentyloxy)-4-cyanobiphenyl: mp 58–115° C. (nematic mesophase).

The alcohol prepared above was oxidized as described in Example 5. Chromatography on silica gel with hexanetetrahydrofuran (5:1) gave the corresponding aldehyde as an oil. The aldehyde was condensed with N,N-dimethyl-1,8-diamino naphthalene (Example 20) as described in Example 5 to give 2,3-dihydroperimidine 6: mp 166–167° C.; NMR 7.6–6.6(m, 12H), 6.3(d, 2H), 4.25(t, 1H), 3.82(t, 2H), 3.02(s, 6H), 1.7–1.4(m, 6H).

EXAMPLE 7

This example illustrates the formation of liquid crystal coupled 2,3-dihydroperimidine 7 by formation of 4-(hexyloxy)-4′-(6-bromohexyloxy)-biphenyl, conversion of the bromide to an aldehyde, and condensation of the aldehyde with N,N′-dimethyl-1,8-diamino naphthalene.

A solution of 4′-(hexyloxy)biphenol (8.10 g, 30 mmol), potassium carbonate (8.30 g, 60 mmol), 1,6-dibromohexane (22.0 g, 90 mmol) and acetone (80 mL) was heated to reflux for 24 h. One-half the acetone was removed by distillation and the mixture was poured into tetrahydrofuran:ether, 1:1 (600 mL), and washed with water. The solution was dried over magnesium sulfate and concentrated to a solid. The solid was recrystallized from tetrahydrofuran-ether to give 4′-(hexyloxy)-4-(6-bromohexyloxy)biphenyl (5.0 g, 38%): mp 103–105° C.; NMR 7.4(d, 4H), 6.85(d, 4H), 3.92(t, 4H), 3.4(t, 2H), 2.0–1.2(m, 16H), 0.9(t, 3H).

The above bromide (4.33 g, 10 mmol) was heated with dimethylformamide (20 mL) and potassium acetate (2.0 g, 20 mmol) for 3 h at 60–70° C. The mixture was diluted with water (100 mL) and filtered, and the solid was dried to give the corresponding acetate (3.6 g, 87%): mp 91–93° C. The acetate (3.30 g, 8 mmol) was heated with methanol (20 mL) and potassium hydroxide (0.70 g, 10 mol) for 40 min, cooled to room temperature and filtered to give the alcohol (2.7 g, 91 %): mp 137=139° C.; NMR 7.4(d, 4H), 6.88(d, 411), 4.18(t, 1H), 3.95(t, 4H), 3.40(m, 2H), 1.9–1.2(m, 16H), 0.9(m, 3H).

The above alcohol (2.70 g, 7 mmol) was treated with pyridinium chlorochromate (2.15 g, 10 mmol), in dichloromethane (30 mL) for 1.5 h at room temperature. The mixture was diluted with ether (150 mL) and the supernatant decanted. The supernatant was concentrated, and the residue was dissolved in ethyl acetate and run through a 3 inch column of silica with the same solvent. The resulting solid was recrystallized from hexane-ethyl acetate to give the corresponding aldehyde (1.60 g, 62%): mp 119–125° C.; NMR 9.78(s, 1H), 7.4(d, 4H), 6.9(d, 4H), 3.95(t, 4H), 2.37(t, 2H), 1.8–1.2(m, 14H), 0.85(t, 3H).

The above aldehyde (1.47 g, 4 mmol) was treated with N,N′-dimethyl-1,8-diaminonaphthalene (4.2 mmol), and para-toluenesulfonic acid (5 mg) in tetrahydrofuran (15 mL) for 20 min at room temperature. The solution was diluted with ether, washed with dilute sodium carbonate, and concentrated. The residue was recrystallized from hexane-ethyl acetate to give the 2,3-dihydroperimidine 7 (1.22 g, 59%): mp 89–90° C.; NMR 7.5–6.75(m, 12H), 6.34(d, 2H), 4.24(t, 1H), 3.9(2t, 4H), 3.02(s, 6H), 1.8–1.2(m, 16H), 0.85(t, 3H).

EXAMPLE 8

This example illustrates the preparation of the diazo liquid crystal coupled dye 8.

The monoazo nitro amine

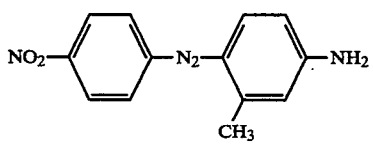

is first prepared as follows 4-Nitroaniline (16.5 g, 0.12 mol) was dissolved in 10 N hydrochloric acid (40 mL) at 75° C. The solution was diluted with water (40 mL), poured over 100 g ice, and cooled to 0° C. Sodium nitrite solution (64.0 mL, 2 M) was added over 5 min. Within 30 min the solution turned almost clear. Urea (1.0 g) was added and stirring was continued at 0° C. for 20 min. In a separate beaker distilled m-toluidine (17.1 g, 0.16 mol) was mixed with 5 N hydrochloric acid (40 mL) for 5 min at room temperature and then cooled to 0–5° C. The diazonium salt solution was added all at once to the m-toluidine hydrochloride suspension at 0–5° C. The mixture immediately set up into a thick red paste. The reaction was allowed to proceed for 2 h at 5° C. The mixture was basified by pouring into saturated potassium carbonate and the resulting solid was washed twice with warm water. Recrystallization of the solid twice from tetrahydrofuran (90 mL) and ethanol (200 mL) gave the monoazo nitro amine as red needles (8.52 g, 28%): mp 152° C.; $^1$H NMR (CDCl$_3$) 2.67(s, 3H), 4.15(bs, 2H), 6.5(s and d, 2H), 7.65(d, $^1$H), 7.85 and 8.22(2d, 4H); IR (KBr) 3430, 3340, 3220, 1645, 1602, 1520 cm$^{-1}$.

The nitroamine (0.51 g, 2 mmol) was mixed with 5N HCl (1.4 mL) and water (3.6 mL) to a fine paste in a 15 mL beaker. Sodium nitrite solution (1.10 mL, 2 M, 2.2 mmol) was added over 3 min at room temperature, stirred 5 min with a glass rod and then cooled to 0° C. In a second beaker, the liquid crystal coupled amine 1 from Example 1 (1.16 g, 2.8 mmol), acetic acid (8 mL) and sodium acetate (0.5 g) was heated to dissolve and cooled to 0° C. The diazonium solution was added to the acetic acid solution all at once and rinsed with 2 mL water. The mixture was stirred occasionally at 0–5° C. over 1.5 h and basified with saturated sodium carbonate solution. The resulting solid was washed twice with hot water to give a black solid that was treated with THF-ethanol (1:1) to give dye 8 (1.0 g, 73.5%) having a melting point of 200° C.

EXAMPLE 9.

This example illustrates the formation of liquid crystal coupled dichroic dye 9.

The nitroamine from Example 8 was coupled with liquid crystal coupled amine 2 (Example 2) as described in Example 8 to give liquid crystal coupled dichroic dye 9 (1.05 g, 80%): mp 204° C.; lambda max (CHCl$_3$)=532 nm, molecular extinction coefficient ("e")=35,248; solubility in ZLI 1982 nematic host=0.15 wt %.

EXAMPLE 10

This example illustrates the formation of liquid crystal coupled diazo diamine 10.

To a solution of the liquid crystal coupled dichroic dye 8 (prepared in Example 8) (0.85 g, 1.25 mmol), ethanol (12 mL), and THF (6 mL) was added a solution of sodium hydrogen sulfide (0.56 g, 10 mmol) in water (2 mL) at 65–70° C. The mixture was stirred for 1 h at 65–70° C. The THF was evaporated and the remaining solution poured into water. The solid was collected and recrystallized from THF-ethanol (1:2) to give the diazo diamine 10 (0.60 g, 74%): mp 180° C.; $^1$H NMR (CDCl$_3$-d6 DMSO, 2:1) 7.6(m, 11H), 7.23(s, 1H), 6.62(2d, 4H), 6.37(s, 1H), 5.73 and 5.40(2bs, 2H) 3.97(t, 2H), 3.82(s, 3H), 3.20(bt, 2H), 2.68 and 2.62(2s, 6H), 1.9–1.5(m, 8H); NMR also showed 1.5 equivalents of THF that could not be removed by drying the sample at 60° C. (0.1 mm Hg) for 16 h; solubility in ZLI 1982=0.64 wt %; lambda max (CHCl$_3$)=495 nm, e=40,193; order parameter (0.48 wt % in ZLI 1982)=0.68.

EXAMPLE 11

This example illustrates the formation of liquid crystal coupled diazodiamine 11.

Treatment of liquid crystal coupled dye 9 as described for the synthesis of dye 10 gave dye 11 (0.60 g, 74%): mp 202° C.; solubility in ZLI 1982=0.38 wt %; lambda max (CHCl$_3$)=495 nm, e=40,556.

EXAMPLE 12

This example illustrates the formation of bis liquid crystal coupled tetraazo dye 12.

The diazo diamine

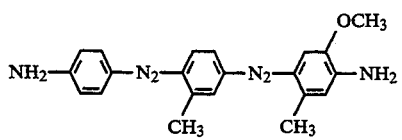

was first prepared by coupling the monoazo nitro amine from Example 8 with 2-methoxy-5-methyl aniline and reducing the diazo nitro amine to the diazo diamine with sodium hydrogen sulfide. Thus, the monoazo nitro amine from Example 8 (7.68 g, 30 mmol) was worked with 5 N hydrochloric acid (21 mL) to form a fine paste. The mixture was diluted with water (54 mL), stirred for 5 min and 2 M sodium nitrite solution (16.5 mL, 33 mmol) was added over 5 min at room temperature. The mixture was stirred 5 min at room temperature and cooled to 0–5° C. In a separate beaker 2-methoxy-5-methylaniline (5.7 g, 42 mmol) and sodium acetate (7.5 g, 92 mmol) were mixed with glacial acetic acid (51 mL) and water (9 mL) at room temperature and cooled to 0–5° C. The diazonium solution was added, the mixture stirred at 0–5° C. for 1 h, and the mixture basified with saturated potassium carbonate solution. The resulting solid was washed with warm water, and recrystallized from tetrahydrofuran-ethanol (1:2, 180 mL) to give green crystals of diazo nitro amine (8.66 g, 71%): mp 190° C.; $^1$H NMR (CDCl$_3$-d6 DMSO) 2.58(s, 3H), 2.78(s, 3H), 3.85(s, 3H), 4.36(s, 2H), 6.5(s, 1H), 7.2(s, 1H), 7.65(m, 3H), 7.88 and 8.3(2d, 4H); IR (KBr) 3470, 3360, 1619, 1518, 1503 cm$^{-1}$.

The diazo nitroamine (1.62 g, 4 mmol) was added to absolute ethanol (50 mL) and was heated to 65° C. under a nitrogen atmosphere in an oil bath. A solution of sodium hydrogen sulfide (0.67 g, 12 mmol) in water (4 mL) was added and the mixture heated for 20 min at 65–70° C. An additional amount of sodium hydrogen sulfide (0.34 g, 6 mmol) in water (2 mL) and 10 mL of ethanol were added and the heating was continued for 10 min. The solvent was removed under reduced pressure and the residue was worked with warm water (250 mL) on a steam bath for 10 min. The resulting solid was collected and recrystallized from tetrahydrofuranethanol (1:4, 25 mL) to give the above illustrated diazo diamine (1.15 g, 77%): mp 196° C.; $^1$H NMR (CDCl$_3$ and d6 DMSO, 2:1) 2.56(s, 3H), 2.67(s, 3H), 3.82(s, 3H), 5.15(bs, 2H), 5.42(bs, 2H), 6.6(m, 3H), 7.22(s, 1B), 7.7(m, 5H); IR (KBr) 3480, 3320, 1620, 1601, 1505 cm$^{-1}$.

To a suspension of the above diazo diamine (0.75 g, 2 mmol, 374) in 5 N HCl (2.8 mL) and water (3.6 mL) was added a 2M sodium nitrite solution (2.2 mL, 4.4 mmol) over 3 min with stirring at room temperature. The mixture was stirred 5 min at room temperature and cooled to 0–5° C. In a second beaker the liquid crystal coupled aniline 4 (1.85 g, 4.8 mmol, Example 4), sodium acetate (1.0 g) and acetic acid (16 mL) were mixed and cooled to 0° C. The diazonium solution was added to the acetic acid solution all at once at 0–5° C. The mixture set-up to a thick suspension over a period of several minutes. The mixture was stirred occasionally for 0.5 h at 0–5° C. and warmed to room temperature for 0.5 h. The mixture was basified with concentrated sodium carbonate, filtered and the solid washed with water. The solid was recrystallized twice from THF-Ethanol (2:1) to give dye 12 (0.35 g, 15%): mp 121° C.; solubility in ZLI 1982 nematic host=13.92 wt %; lambda max (CHCl$_3$)=529 nm, e=69,937; order parameter in ZLI 1982 at 1.18 wt %=0.75.

EXAMPLE 13

This example illustrates the formation of his liquid crystal coupled dye 13.

To a suspension of the diazo diamine from Example 12 (0.375 g, 1 mmol) in 5 N HCl (1.4 mL) and water (1.8 mL) was added 2M sodium nitrite (1.1 mL, 2.2 mL) over 2.5 min at room temperature. The mixture was stirred for 1.5 min at room temperature and cooled to 0–5° C. In a second beaker the liquid crystal coupled 2,3-dihydroperimidine 5 (1.20 g, 2.6 mmol, Example 5), sodium acetate (0.50 g), acetic acid (6 mL) and THF (6 mL) were mixed at room temperature. The mixture was cooled to 0–5° C. and the diazonium solution was added to the acetic acid solution all at once. A black solid immediately set up. Further stirring for 0.5 h gave a heavy black suspension. The mixture was basified with saturated potassium carbonate, washed well with water and dried to a solid (1.70 g). Chromatography on silica (hexane-THF, 1:1, and then 3:5) gave a solid that was recrystallized from THF-ethanol to give dye 13 (0.60 g, 47%): mp 215–217° C.; $^1$H NMR (CDCl$_3$) 8.3(d, 2H), 8.0–7.3(m, 24H), 7.17(s, 1H), 6.8(d, 4H), 6.4(m, 4H), 4.4(t, 2H), 4.03(s, 3H), 3.84(m, 4H) 3.17, 3.05, 2.85, 2.78 (4s, 6H,6H,3H,3H), 1.9–1.2(m, 16H); IR (KBr) 2225, 1590 cm$^{-1}$; solubility in ZLI 1982 nematic host=3.46 wt %; lambda max (CHCl$_3$)=609 nm, e=60,857; order parameter in ZLI 1982 at 1.0 wt %=0.81; solubility in ZLI 2452 nematic host=1.47 wt %; order parameter at 1.47 wt %=0.80.

EXAMPLE 14

This example illustrates the formation of bis liquid crystal coupled dye 14.

The diazo diamine from Example 12 was diazotized and coupled with the liquid crystal coupled 2,3-dihydroperimidine of Example 7 to give dye 14. The crude dye was purified by chromatography on silica with hexane-tetrahydrofuran (2:1) and recrystallized from tetrahydrofuran-ethanol (2:1) to give dye 14: mp 177 C; lambda max (CHCl$_3$)=607 nm, e=70,011; solubility in ZLI 2452 nematic host=4.51 wt %.

EXAMPLE 15

This example illustrates the formation of the liquid crystal coupled dichroic dye 15.

The diazo phenol

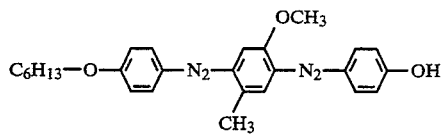

was first prepared by sequential diazotization of 4-hexyloxyaniline, coupling with 2-methoxy-5-methylaniline, diazotization of the monoazo amine, and coupling with phenol. Thus, to a suspension of 4-hexyloxyaniline (5.8 g, 30 mmol) in 10 N HCl (10 mL) and water (30 mL) was added 2M sodium nitrite solution (16 mL, 32 mmol) over 5 min at 0–5° C. The solution was stirred occasionally over 30 min at 0–5° C. In a second beaker 2-methoxy-5-methyl aniline (5.5 g, 40 mmol), sodium acetate (8.4 g, 0.1 mol) and acetic acid (50 mL) were mixed well for 5 min and cooled to 0–5° C. The diazonium solution was added to the acetic acid solution all at once and the mixture was stirred over 30 min at 0–5° C. The mixture was basified with 25% sodium hydroxide to pH=10, filtered, and the solid was washed with hot water. The solid was dried under vacuum and recrystallized from ethanol to give the monoazo amine (6.36 g, 62%): mp 97° C.; NMR 7.7 and 6.85(2d, 4H), 7.2 and 6.47(2s, 2H), 4.0(m, 4H), 3.8(s, 3H), 2.57(s, 3H), 1.9–1.2(m, 8H), 0.9(t, 3H); IR (KBr) 3460, 3355, 1615, 1602, 1580 cm$^{-1}$.

To a suspension of the above monoazo amine (1.70 g, 5 mmol) in 5N HCl (3.5 mL) and water (9 mL) was added 2 M sodium nitrite (2.75 mL, 5.5 mmol) in 3 portions over 3 min at room temperature. The mixture was mixed 5 min at room temperature and cooled to 0–5° C. In a second beaker, phenol (0.56 g, 6 mmol), sodium acetate (1.6 g, 20 mmol) and acetic acid (12 mL) were mixed and cooled to 0–5° C. The diazonium solution was added to the acetic acid solution all at once at 0–5° C. The mixture was stirred 30 min and basified with saturated sodium carbonate to pH=7.0. The solid was filtered and washed with warm water. The solid was treated with ethanol (30 mL) and acetone (5 mL) on a steam bath and filtered to remove insoluble material. The solvent was removed and the residual material was dissolved in toluene and chromatographed on silica gel (hexane-ethyl acetate, 5:1) to give the diazo phenol (0.80 g, 36%): mp 151° C.; $^1$H NMR (CDCl$_3$) 7.80(m, 4H), 7.48 and 7.30(2s, 2H), 6.85(m, 4H), 6.22(bs, 1H), 3.96(s and t, 5H), 2.63(s, 3H), 1.9–1.2(m, 8H), 0.9(t, 3H); IR (KBr) 3600–3200, 1600, 1580 cm$^{-1}$.

To a solution of the above diazo phenol (0.89 g, 2 mmol) in THF (6 mL) was added potassium t-butoxide (0.50 g, 4.4 mmol) at room temperature. A violet solid precipitated. Dimethylformamide (2 mL) was added to obtain a solution, followed by addition of 4'-(6-bromohexyloxy)-4-cyanobiphenyl (0.79 g, 2.2 mmol, Example 1) in THF (2 mL). The mixture was heated to 70° C. for 3.5 h and cooled to room temperature over night. Additional portions of potassium t-butoxide (0.50 g, 4.4 mmol) and bromide (0.79 g, 2.2 mmol) were added and heating was continued for 2.75 h. The mixture was diluted with water and acidified with 1N HCl, extracted with ether-dichloromethane (4:1), and the extract was dried (MgSO4) and concentrated to a solid. The solid was chromatographed on silica (hexane-THF, 4:1) to give dye 15 (0.19 g, 13%): mp 125–128° C.; $^1$H NMR (CDCl3) 7.93(d, 4H), 7.58–7.3(m, 8H), 6.93(d, 6H), 4.03(m, 9H), 2.57(s, 3H), 1.9–1.2(m, 16H), 0.85(t, 3H); IR (KBr) 2225, 1602, 1580 cm$^{-1}$; solubility in ZLI 1982=0.275 wt %; lambda max (CHCl3)=414 nm, e=21,042.

EXAMPLE 16

This example illustrates the formation of liquid crystal coupled dye 16.

The diazo phenol

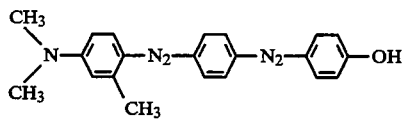

was first prepared by diazotization of 4-nitroaniline and coupling with N,N-dimethyl-m-toluidine, followed by reduction of the nitro group to the amine, diazotization, and coupling with phenol. Thus, 4-nitroaniline (13.8 g, 0.1 mol), 10 N hydrochloric acid (33 mL), and water (33 mL) were mixed well and cooled to 0° C. in an ice bath. A 2M sodium nitrite solution (52.8 mL, 105.6 mmol) was added over 5 min and the mixture was stirred 30 min. Urea (1.5 g) was added and the mixture was stirred an additional 15 min. In a second beaker, N,N-dimethyl-m-toluidine (14.8 g, 0.11 mol) and 5N hydrochloric acid (33 mL) were mixed and cooled to 0° C. The diazonium ion solution was added to the second beaker and the mixture was stirred occasionally over 2 h at 0° C. The resulting solid mass was basified by addition to concentrated potassium carbonate solution (300 mL). The solid was washed three times with water and air dried overnight. Recrystallized from tetrahydrofuran gave an orange solid (19.0 g, 65%): mp 177–178° C. NMR 8.2(d, 2H), 7.75(m, 3H), 6.5(m, 2H), 3.05(s, 6H), 2.66(s,3H).

The monoazo nitro amine described above (2.92 g, 10 mmol) in ethanol (100 mL) was treated with sodium sulfide (7.2 g, 30 mmol) in water (10 mL) at 60–70° C. for 20 min. Water (100 mL) was added and the mixture cooled to 0° C. in an ice bath for 2 h. The mixture was filtered and the solid dried to give the intermediate monoazo diamine (2.3 g, 88%): mp 129–130° C.

The monoazo diamine from above (2.62 g, 10 mmol) was mixed with 5N hydrochloric acid (10.8 mL) and water (15 mL) and cooled to 0° C. Sodium nitrite solution (2M, 5.5 mL, 11 mmol) was added over 2 min and the mixture stirred 0.5 h at 0° C. to give a thick paste. In a second beaker phenol (1.24 g, 13 mmol), sodium acetate (2.5 g) and acetic acid (15 mL) were mixed and cooled to 0° C. The acetic acid mixture was added all at once to the diazonium ion at 0° C. The mixture was stirred occasionally over 1 h and basified by addition to concentrated potassium carbonate solution (200 mL). The mixture was extracted twice with tetrahydrofuran-ether (1:1), and the extract was washed with water and brine, and dried over potassium carbonate. The mixture was concentrated to an oil and purified by chromatography on silica gel with hexane-ethyl acetate (3:1) to give the diazo phenol (1.9 g, 53%): mp 140–142° C.; NMR 7.9(m, 6H), 7.35(s, 1B), 6.85(d, 2H), 6.55(m, 2H), 3.05(s, 6H), 2.7(s, 3H), 2.5(bs, 1H).

The diazo phenol was treated with potassium carbonate (0.42 g, 3 mmol), 4'-(6-bromohexyloxy)-4-cyanobiphenyl (0.53 g, 1.5 mmol, Example 1) and methyl ethyl ketone (10 mL) at reflux for 6 h. To the mixture was added 50 mL water and 10 mL ethanol. The resulting solid was collected and recrystallized from tetrahydrofuran to give the diazo liquid crystal coupled dye 16 (0.46 g, 70%): mp 204° C.

EXAMPLE 17

This example illustrates the formation of liquid crystal coupled diazo dye 17.

The monoazo amine

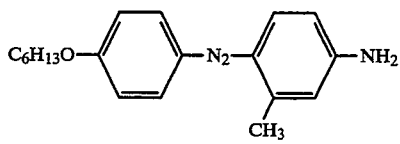

was first prepared by diazotization of 4-hexyloxy aniline and coupling with m-toluidine. Thus, to a suspension of 4-hexyloxyaniline (5.8 g, 30 mmol) in 10N HCl (10 mL) and water (30 mL) was added 2M sodium nitrite solution (16 mL, 32 mmol) over 5 min at 0–5° C. The solution was stirred occasionally over 30 min at 0–5° C. In a second beaker, m-toluidine (4.28 g, 40 mmol), sodium acetate (8.4 g, 0.1 mol) and acetic acid (50 mL) were mixed for 5 min and cooled to 0–5° C. The diazonium solution was added to the acetic acid solution all at once and the mixture was stirred over 30 min at 0–5° C. The mixture was basified with 25% sodium hydroxide to pH=10, filtered, and the solid was washed with hot water. The solid was dried under vacuum and recrystallized from methanol to give the monoazo amine (5.0 g, 54%): mp 83–85° C.

To a suspension of the above monoazo amine (1.55 g, 5 mmol) in 5N HCl (3.5 mL) and water (9 mL) was added 2M sodium nitrite (2.75 mL, 5.5 mmol) in 3 portions over 3 min at room temperature. The mixture was mixed 5 min at room temperature and cooled to 0–5° C. In a second beaker, liquid crystal coupled amine 4 (Example 4), sodium acetate (1.25 g, 20 mmol), and acetic acid (20 mL) was mixed and cooled to 0–5° C. The diazonium solution was added to the acetic acid solution all at once at 0–5° C. The mixture was stirred for 1 h and basified with saturated potassium carbonate. The solid was collected and recrystallized from tetrahydrofuran-ethanol (1:1) to give liquid crystal coupled diazo dye 17 (2.4 g, 69%): mp 137–139° C., nematic phase evident to 204° C.; lambda max (CHCl3)=480 nm, e=34,435; solubility (ZLI 1982 nematic host)=1.60 wt %; solubility (ZLI 2452 nematic host)=1.77 wt %; order parameter (1% ZLI 2452)=0.785.

EXAMPLE 18

This example illustrates the formation of liquid crystal coupled diazo dye 18.

The diazo phenol

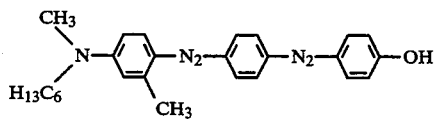

was prepared from N-hexyl-N-methyl-m-toluidine using a procedure similar to that described in Example 16. The diazo dye 18 was prepared from the diazo phenol using a similar procedure to that described in Example 16. The crude product was purified on silica gel with hexane-tetrahydrofuran (3:1) to give 0.90 g solid which was recrystallized twice from tetrahydrofuran-ethanol (1:3) and the same solvents (1:1) to give the diazo dye 18 (0.25 g, 5%): mp 127.5, smectic phase to 185° C., nematic phase to 237° C.; lambda max (CHCl$_3$)=491, e=35,448; solubility in ZLI 2452 nematic host=3.90 wt %; order parameter (1 wt % in ZLI 2452)=0.77.

EXAMPLE 19

This example illustrates the formation of liquid crystal coupled dye 19.

The trisazo diamine

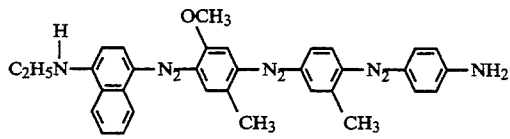

was first prepared by coupling of N-ethyl-1-aminonaphthalene with the diazonium ion derived from the diazo nitro amine described in Example 12, followed by reduction of the nitro group with sodium hydrogen sulfide. The above diamine was selectively diazotized and coupled with the liquid crystal coupled 2,3-dihydroperimidine 5 to give dye 19.

Thus, the diazo nitro amine from Example 12 (2.42 g, 6.0 mmol) was stirred into a fine suspension with 5N hydrochloric acid (4.1 mL) and water (10.8 mL) at room temperature over 5 min. 2M Sodium nitrite solution (3.3 mL) was added over 5 min, followed by stirring 5 min and cooling to 0° C. for 0.5 h. In a second beaker was mixed N-ethyl-1-aminonaphthalene (1.44 g, 8.4 mmol), acetic acid (10 mL), sodium acetate (1.5 g) and water (2 mL). The mixture was heated slightly to attain solution and cooled to 0° C. The diazonium solution was added to the acetic acid solution all at once and the mixture stirred occasionally at 0° C. for 1 h. The mixture was basified with saturated potassium carbonate solution and filtered to give a solid. The solid was washed twice with hot water and recrystallized twice from tetrahydrofuran-ethanol (90 mL, 1:2); the solid being collected at room temperature to give 1.94 g trisazo nitro amine (60%): mp 271° C.

A suspension of the trisazo nitro amine (1.25 g, 2.1 mmol) was heated to 60–70° C. in ethanol (5 mL) and tetrahydrofuran (15 mL). Sodium hydrogen sulfide (0.34 g, 6 mmol) in water (1 mL) was added and the mixture stirred a total of 40 min with a further addition of sodium hydrogen sulfide (0.10 g) after 20 min. The mixture was concentrated, water (50 mL) was added, and the mixture heated for 10 min. The mixture was filtered and the solid recrystallized from tetrahydrofuran-ethanol (1:1) to give the above trisazo diamine 1.10 g (92%): mp 200–204° C.; lambda max (CHCl$_3$)=557 nm, e=48,302; solubility (ZLI 1982)=4.04 wt %.

The trisazo diamine (0.57 g, 1 mmol) was suspended in 5N hydrochloric acid (0.9 mL) and water (1.80 mL) and 2M sodium nitrite (0.55 mL) was added at room temperature and mixed for 3–4 min. The mixture was cooled to 0–5° C. and allowed to stir occasionally over 15 min. In a second beaker a solution of the liquid crystal coupled 2,3-dihydroperimidine 5 (0.60 g, 1.3 mmol), sodium acetate (0.4 g), acetic acid (3 mL) and tetrahydrofuran (4 mL) was prepared and cooled to 0° C. The diazonium solution was added to the second beaker all at once and stirred for 30 min at 0–5° C. The mixture was basified with saturated potassium carbonate and the tetrahydrofuran evaporated. The aqueous phase was decanted and the oily mass heated and stirred with water to form a black solid. Chromatography of the solid on silica gel with hexane-tetrahydrofuran (3:2) gave a major fraction that was recrystallized from tetrahydrofuran-ethanol (15 mL, 1:1) to give dye 19 (0.21 g, 21%): mp 135° C.; lambda max (CHCl3)=590 nm, e=71,392; solubility in ZLI 1982=0.72 wt %; order parameter in ZLI 1982 (0.7 wt %)=0.73.

EXAMPLE 20

This example illustrates the formations of a tetraazo-C12 blue dye

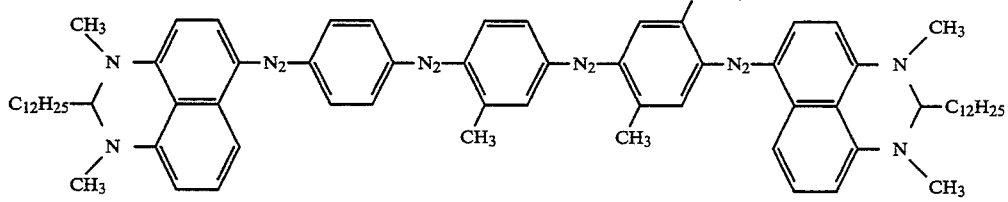

used in the formulation of a black dye mixture in Example 21.

N,N'-dimethyl-1,8-naphthalene diamine was first prepared and condensed with tridecanal to give 2,3-dihydro-1,3-dimethyl-2-dodecylperimidine. The 2,3-dihydroperimidine was coupled with the his diazonium salt prepared in Example 12 to give the above blue dye.

1,8-Naphthalene diamine was distilled on a Kugelrohr distillation apparatus (Aldrich Chemical Co.) at 140–160° C. (0.1 mm Hg) to give a pink solid. Then, a mixture of the distilled 1,8-naphthalene diamine (21.8 g, 0.138 mol, Molecular Weight 158), p-toluene sulfonic acid (0.75 g), and 3-methyl-2-butanone (24.6 g, 0.30 mol, molecular weight 82) was prepared, stirred at 50–60° C. for 1 hour, and allowed to sit overnight at room temperature. The mixture was transferred to a 500 ml 3-neck flask. Water (30 ml), acetone (150 ml), potassium carbonate (84 g, 0.6 mol), and iodomethane (84 g, 0.60 mol) were added and the mixture mechanically stirred at 60–70° C. for 2 hours, after which more iodomethane (21.0 g, 0.15 mol) was added. The reaction was monitored by thin layer chromatography (TLC) using hexane-ethyl acetate (5:1) as an eluting solvent. After 5.5 hours, the excess methyl iodide and some acetone (25 ml) was distilled and the mixture diluted with water (500 ml) and extracted with ether (2 times, 400 ml and 200 ml portions). The ether extracts were washed with brine and concentrated to a black solid. The solid was dissolved in distilled tetrahydrofuran (THF) (100 ml) and 2N HCl (in distilled water) (300 ml). TLC indicated that the hydrolysis reaction was complete. The mixture was cooled, basified to a pH greater than 11 with ammonium hydroxide (150 ml) and extracted with ether (400 ml and 200 ml portions). The extract was washed with brine, dried over potassium carbonate and concentrated to a solid. The solid was distilled (Kugelrohr, 98–102° C., at 0.1 mm Hg) to give a beige solid (21.4 g). The solid was dissolved in hot ethyl acetate (40 ml) and diluted with hexane (160 ml). Cooling gave crystals of N,N'-dimethyl-1,8-naphthalene diamine (15.1 g, 59%): melting point (mp) 102–104° C.; NMR (CDCl$_3$) 7.15(m, 4H), 7.5(d of d, 2H), 5.4(bs, 2H), 2.85(s, 6H); IR (KBr) 3360, 1595 cm$^{-1}$.

A mixture of the N,N'-dimethyl-1,8-naphthalene diamine (0.50 g, 2.7 mmol, 186), tridecanal (0.56 g, 2.85 mmol. 197), p-toluenesulfonic acid (5 mg), and tetrahydrofuran (5 ml) was prepared and stirred at room temperature for 15 minutes. The mixture was basified with 25% sodium hydroxide (1.0 ml), diluted with water (20 ml) and extracted with ether (100 ml). The extract was dried over potassium carbonate, concentrated to give 2,3-dihydro-1,3-dimethyl-2-dodecyl perimidine as a solid: mp 30–32° C.; NMR (CDCl$_3$) 7.13(m, 4H), 6.32(d, 2H), 4.27(t, 1H), 3.02(s, 6H), 1.7–1.1(m, 22H), 0.85(t, 3H); IR (neat) 1595 cm$^{-1}$.

The diazo diamine described in Example 12 (0.375 g, 1 mmol) was diazotized and coupled with 2,3-dihydro-1,3-dimethyl-2-dodecyl perimidine (1.0 g, 2.56 mmol) in a mixture of sodium acetate (0.5 g) and acetic acid-THF (1:1, 12 ml). The crude solid was worked with hot THF (50 ml) and filtered. The filtrate was purified on silica (hexane-THF, 2.5:1) to give a solid (0.54 g) and recrystallized from THF-ethanol (1:1, 30 ml) to give the dye shown below (0.50 g, 45%): mp 157° C.; NMR (CDCl$_3$) 8.25(d, 2H), 8.1–7.2(m, 13H), 6.4(m, 4H), 4.35(t, 2H), 4.04(s, 3H), 3.15, 3.02, 2.85, 2.75(4s, 18H), 1.8–1.1(m, 44H), 0.9(m, 6H); IR (KBr) 1590 cm$^{-1}$; lambda max (CHCl$_3$)=612 nm, e=72,166. This dye was measured to have a solubility of 1.76 wt % in ZLI 1982 and 1.21 wt % in ZLI 2452;, and order parameters of 0.77 (1 wt % in ZLI 1982) and 0.80 (1 wt % in ZLI 2452).

EXAMPLE 21

This Example illustrates the formation of a black dye formulation for a guest-host nematic liquid crystal display device using the liquid crystal coupled dyes of this invention.

To a reaction vessel is added the tetraazo blue dye from Example 20 (2 parts), the dye from Example 12 (3.5 parts), the dye from Example 13 (5 parts), the dye from Example 19 (3 parts), and the yellow dye solution ZLI 3881 (200 parts, comprising about 2.5 wt % yellow dye in ZLI 2452, EM Industries, Hawthorne, N.Y.). This mixture was diluted with a chiral dopant, CB-15 (22.5 parts, BDH Limited, Poole, England), and ZLI 2452 nematic host (340 parts, EM Industries). The mixture was stirred at 70° C. for 24 h. The formulation was cooled and filtered through a 0.45 micron teflon membrane filter (Gelman Sciences, Ann Arbor, Mich.). The filtered material was used to vacuum fill an 11 micron thick display cell. The contrast ratio between the "on" state at 30 VAC and the "off" state was measured to be 4.6, with a brightness of 54% based on a comparison to a reference cell containing only the host liquid crystal.

While the invention has been described with respect to specific embodiments, it should be understood that they are not intended to be limiting and that many variations and modifications are possible without departing from the scope of this invention.

What is claimed is:

1. A liquid crystal coupled dichroic dye composition comprising a dichroic dye moiety coupled to one or two nematogenic or smectogenic liquid crystal moieties by a flexible spacer group having at least four atoms linked in a linear fashion wherein the liquid crystal coupled dichroic dye composition has the general formulae:

A—X—Y—Z—B     (I)

or

B—Z—Y—X—A—X—Y—Z—B     (II)

wherein A is a nonionic dichroic dye moiety such that the liquid crystal coupled dichroic dye has an absorption maximum between 400 and 2000 nm and an extinction coefficient of greater than 2,000; X and Z are independently:

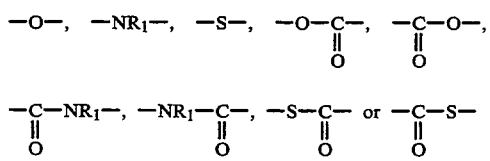

or a covalent bond linkage, wherein R$_1$ is hydrogen, a methyl group, or an ethyl group; Y is a linear or branched C$_2$ to C$_{12}$ alkyl group which is uninterrupted or interrupted by one or more of —O—, —S— or —NR$_1$—; B is a liquid crystal moiety having the general formula:

—D—W—D—R$_2$,     (III)

—D—W—D—D—R$_2$, or     (IV)

—D—D—W—D—R$_2$     (V)

wherein D is a 1,4-disubstituted benzene ring, a 1,4-disubstituted cyclohexane ring, or a 2,5-disubstituted pyrimidine ring, W is

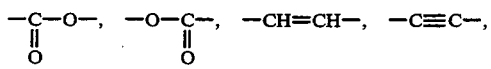

or a covalent bond linkage, provided that W is not a covalent bond linkage when B comprises three rings, R$_2$ is a C$_1$ to C$_{12}$ alkyl group, C$_5$ to C$_7$ cycloalkyl group, C$_1$ to C$_{12}$ alkoxy group, C$_1$ to C$_{12}$ alkoxycarbonyl group, nitrile group, nitro group or NR$_3$R$_4$ wherein R$_3$ and R$_4$ are hydrogen or C$_1$ to C$_{12}$ alkyl groups; and X—Y—Z comprises at least four linearly linked atoms.

2. A liquid crystal coupled dichroic dye composition as claimed in claim 1 wherein the dye moiety A is selected from the group consisting of anthraquinone, azo, diazo, trisazo, tetraazo, pentaazo, hexaazo, stilbene, and phthalocyanine dye moities.

3. A liquid crystal coupled dichroic dye composition as claimed in claim 1 wherein the dye moiety A has a dichroic order parameter of at least 0.4 in a nematic liquid crystal host.

4. A liquid crystal coupled dichroic dye composition as claimed in claim 1 wherein the dye moiety A is selected from the group consisting of azo dyes and polyazo dyes.

5. A liquid crystal coupled dichroic dye composition as claimed in claim 1 wherein the dye moiety A is an anthraquinone dye.

6. A liquid crystal coupled dichroic dye composition as claimed in claim 1 having the general formula (I).

7. A liquid crystal coupled dichroic dye composition as claimed in claim 1 having the general formula (II).

8. A liquid crystal coupled dichroic dye composition as claimed in claim 1 wherein the liquid crystal moiety contains two or three rings selected from the group consisting of benzene rings with 1,4-substitution patterns, cyclohexyl rings with 1,4-substitution patterns or pyrimidines with 2,5-substitution patterns.

9. A liquid crystal coupled dichroic dye composition as claimed in claim 1, wherein the liquid crystal moiety B is —D—W—D—$R_2$ wherein $R_2$ is a nitrile group.

10. A liquid crystal coupled dichroic dye composition as claimed in claim 1, wherein the liquid crystal moiety B is —D—W—D—$R_2$ wherein $R_2$ is a nitro group.

11. A liquid crystal coupled dichroic dye composition as claimed in claim 1 wherein X—Y—Z is a linear chain of 6 to 12 atoms in length.

12. A liquid crystal coupled dichroic dye composition as claimed in claim 1, wherein Y has 4 to 10 carbon atoms, and X and Z are independently —O—, —$NR_1$—, —S— or a covalent bond.

13. A liquid crystal coupled dichroic dye composition as claimed in claim 1, wherein Y is a linear, unsubstituted and uninterrupted alkyl group having an even number of carbon atoms, and X and Z are independently —O—, —$NR_1$—, —S— or a covalent bond.

14. A guest-host composition comprising the liquid crystal coupled dichroic dye composition of claim 1 dissolved in a nematic or smectic liquid crystal host solvent.

15. A liquid crystal device comprising the liquid crystal coupled dichroic dye of claim 1.

16. A liquid crystal device comprising the guest-host composition of claim 14.

17. A liquid crystal device was claimed in claim 15 which is a liquid crystal display comprising at least one cell having two substrates, at least one of which is transparent, filled with the guest-host composition.

18. A module comprising the liquid device of claim 17 and at least one selected from the group consisting of lighting means, a reflector, and transflector.

19. A liquid crystal coupled dichroic dye composition as claimed in claim 1, wherein Y is a linear, unsubstituted and uninterrupted alkyl group having 4, 6, 8 or 10 carbon atoms.

* * * * *